United States Patent

Keenan et al.

[11] Patent Number: 5,671,891
[45] Date of Patent: Sep. 30, 1997

[54] APPARATUS FOR SPREADING MATERIAL

[75] Inventors: Richard Keenan; Richard Christopher Moore; John Keenan, all of Bagenalstown, Ireland

[73] Assignee: Vetron Holdings Limited, Bagenalstown, Ireland

[21] Appl. No.: 464,880

[22] PCT Filed: Dec. 30, 1993

[86] PCT No.: PCT/IE93/00060

§ 371 Date: Jun. 28, 1995

§ 102(e) Date: Jun. 28, 1995

[87] PCT Pub. No.: WO94/15449

PCT Pub. Date: Jul. 21, 1994

[30] Foreign Application Priority Data

Dec. 31, 1992 [IE] Ireland ............ S92 2953

[51] Int. Cl.⁶ .................................................. A01C 19/02
[52] U.S. Cl. .................................................. 239/676
[58] Field of Search ......................... 239/672, 676, 239/666, 1, 505, 512

[56] References Cited

U.S. PATENT DOCUMENTS

| | | |
|---|---|---|
| 2,876,014 | 3/1959 | Markel .................. 239/676 X |
| 3,907,211 | 9/1975 | O'Reilly ................. 239/676 |
| 4,072,272 | 2/1978 | Harder ................... 239/676 |
| 4,473,184 | 9/1984 | Martin ................... 239/676 X |
| 4,801,085 | 1/1989 | Fischer .................. 239/1 |

FOREIGN PATENT DOCUMENTS

| | | | |
|---|---|---|---|
| 417113 | 8/1974 | U.S.S.R. ............... 239/666 |
| 697077 | 11/1979 | U.S.S.R. ............... 239/676 |
| 1 205 135 | 9/1970 | United Kingdom . | |
| 2 177 937 | 2/1987 | United Kingdom . | |

*Primary Examiner*—Kevin Weldon
*Attorney, Agent, or Firm*—Lowe, Price, LeBlanc & Becker

[57] ABSTRACT

A spreader wagon (1) comprises a container (10) for material to be spread. The container (10) is formed by a semi-circular base (14) and side walls (15) and (16) and a downstream end wall (17). A dispensing rotor (30) rotatable in the downstream end (12) of the container (10) dispenses material through a dispensing outlet (19). A piston plate member (45) extending transversely of and slidable in the container (10) from the upstream end (11) to the downstream end (12) retains the material in the container and urges the material into engagement with the dispensing rotor (30). An isolating plate (55) slidable in tracks (57) is lowerable into a closed position for isolating the dispensing rotor (30) from an upstream portion (56) of the container (10) for retaining the material out of engagement with the dispensing rotor (30) until the dispensing rotor (30) has been run up to speed.

18 Claims, 16 Drawing Sheets

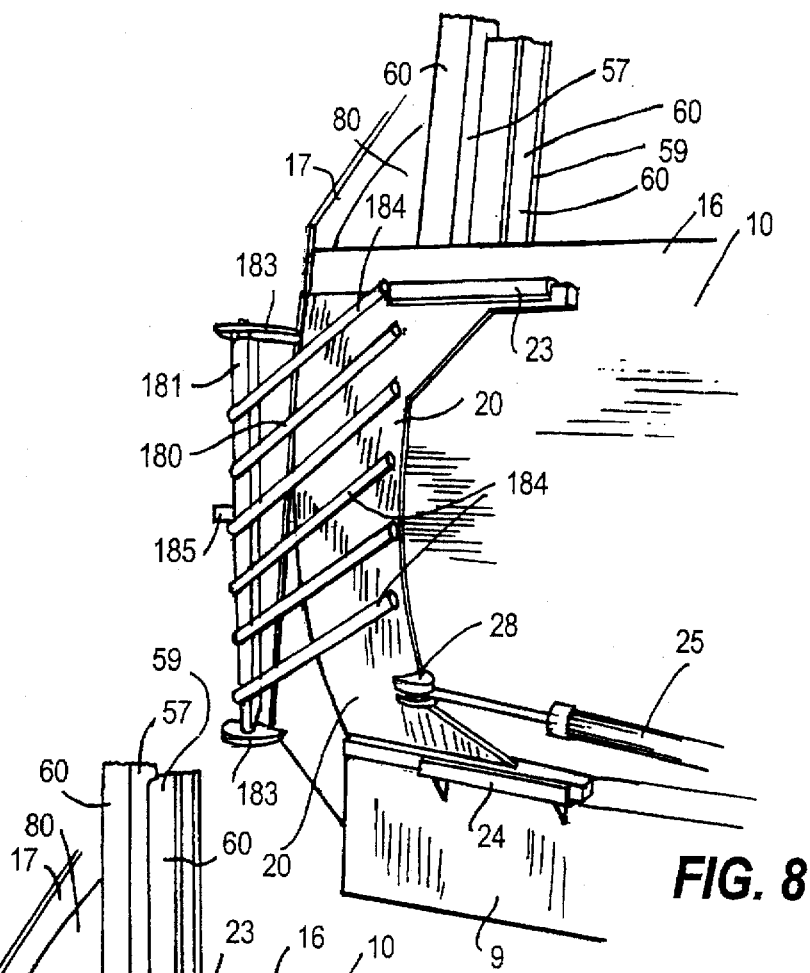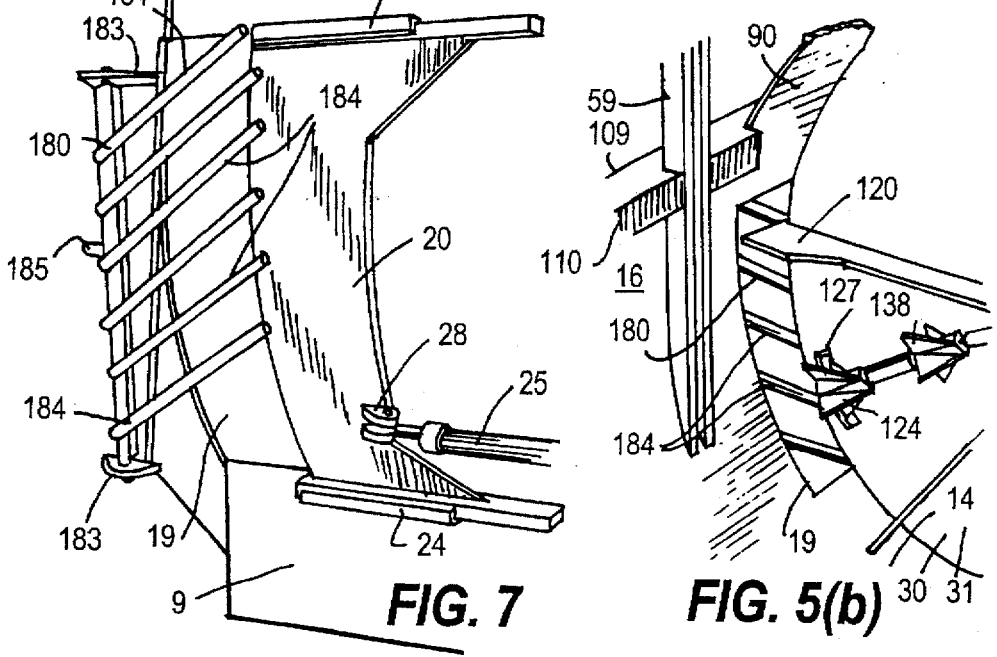

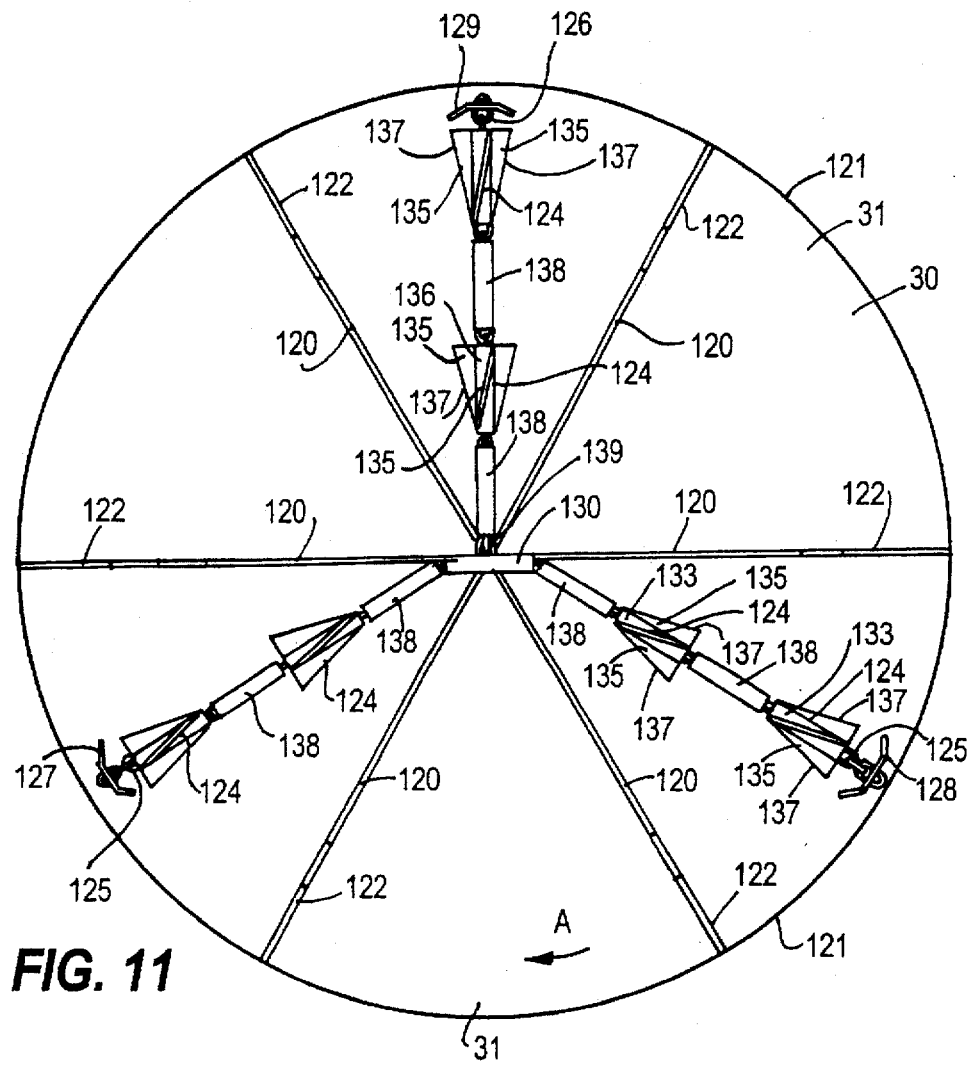
FIG. 11
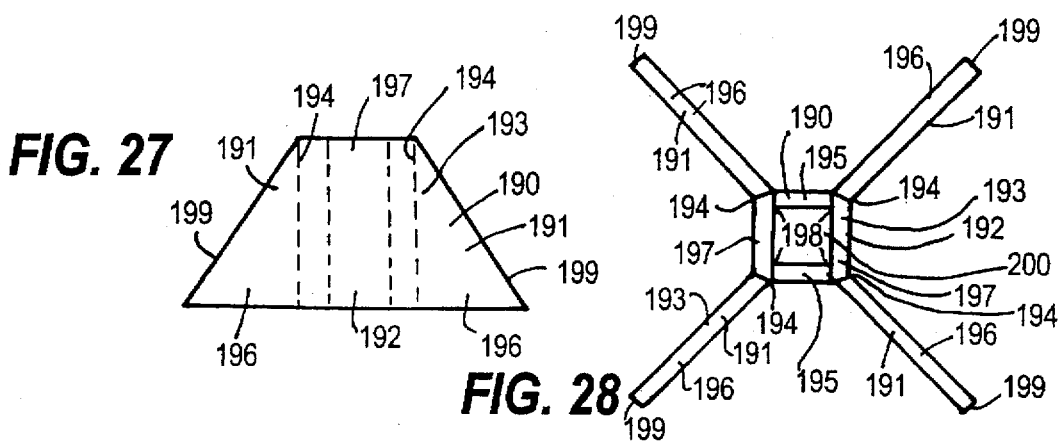
FIG. 27
FIG. 28

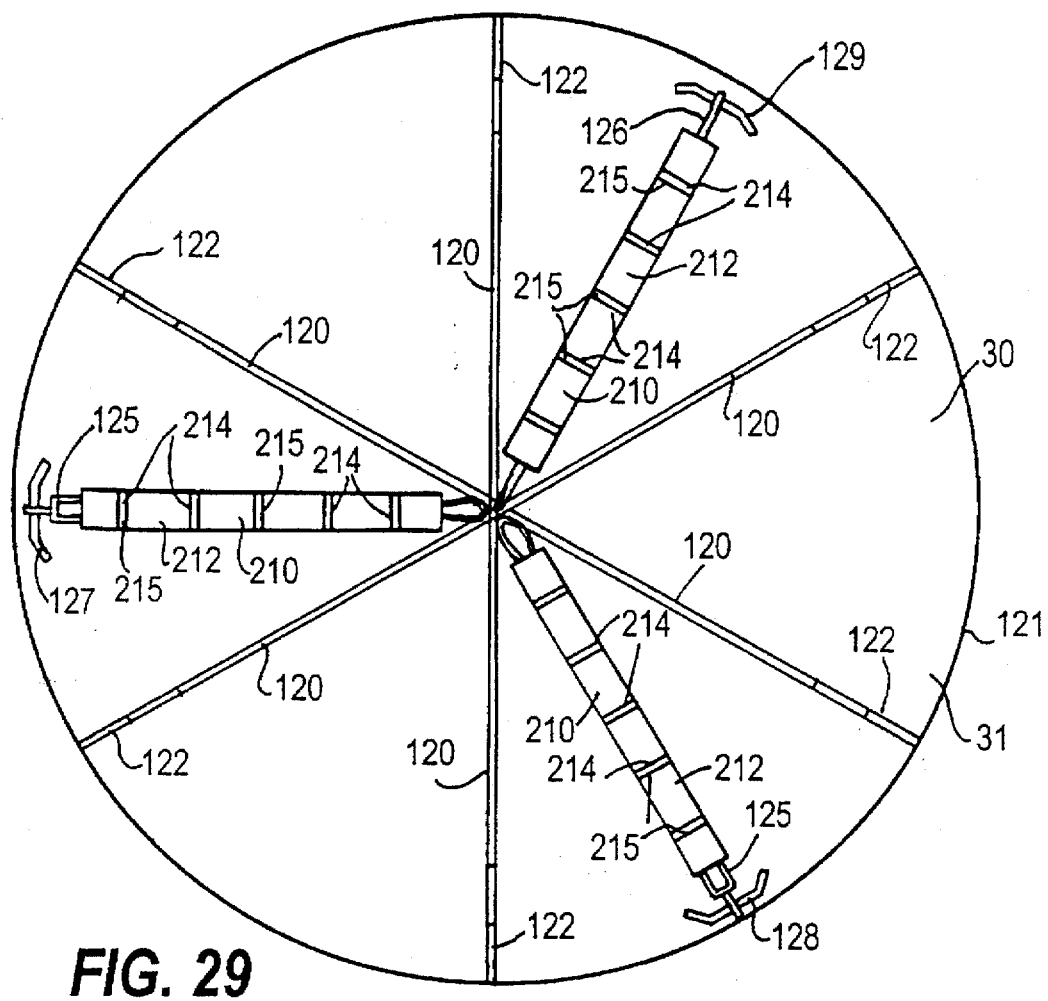
*FIG. 29*
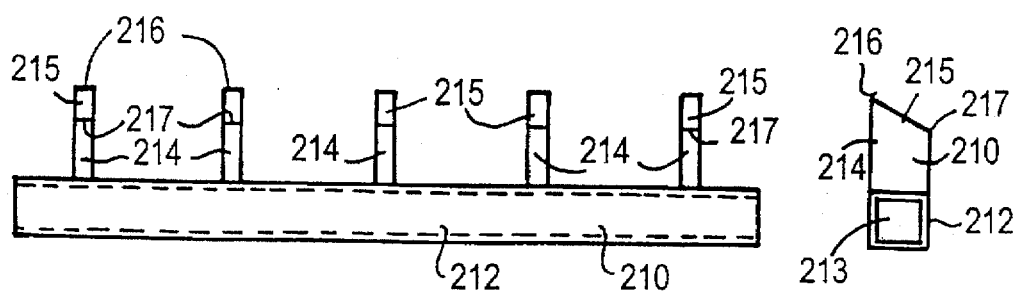
*FIG. 30*   *FIG. 31*

APPARATUS FOR SPREADING MATERIAL

FIELD OF THE INVENTION

The present invention relates to apparatus for spreading material, and in particular, though not limited to apparatus for spreading animal fodder, manure, slurry and the like.

BACKGROUND TO THE INVENTION

Such apparatus is commonly used for agricultural purposes, for example, for spreading fodder or manure. Generally speaking, these types of apparatus are referred to as spreader wagons. In general, such spreader wagons comprise an elongated container and a dispensing rotor rotatably mounted at one end thereof for discharging material from the container through the dispensing outlet. A piston plate is drivable with rectilinear movement along and through the container for urging material in the container towards the dispensing rotor. A typical spreader wagon is illustrated and briefly described in British Specification No. GB-A-2,177,937.

Such spreader wagons in general, are relatively satisfactory for use with relatively dry material, however, they have been found to be particularly unsatisfactory for use with relatively wet materials, particularly, relatively viscous and lumpy slurry type materials. In practice, the slurry tends to settle around the dispensing rotor, thus, immersing a substantial part of the dispensing rotor therein. In many cases the torque required to commence rotation of the rotor when immersed in the slurry is so great as to cause shearing of the rotor shaft or serious damage to the rotor.

There is therefore a need for a spreader wagon, and indeed, for apparatus for spreading materials, in particular, wet, slurry type materials which overcomes these problems.

The present invention is directed towards providing such apparatus.

SUMMARY OF THE INVENTION

According to the invention there is provided apparatus for spreading material, the apparatus comprising an elongated container for the material extending from an upstream end to a downstream end and defining a longitudinally extending central axis, the container comprising a base, a pair of spaced apart side walls extending generally upwardly from the base and between the upstream and downstream ends, and a downstream end wall extending upwardly from the base between the side walls, a dispensing outlet from the container being located adjacent the downstream end thereof, a dispensing rotor mounted in the container at the downstream end, and being rotatable about a rotational axis which extends parallel to the central axis of the container for dispensing material from the container through the dispensing outlet, wherein an isolating means extending transversely of the central axis is located in the container adjacent the downstream end and upstream of the dispensing rotor, the isolating means being movable between a closed position for isolating the dispensing rotor from a portion of the container which is upstream of the isolating means to an open position whereby the dispensing rotor communicates with the upstream portion of the container.

The advantages of the apparatus according to the invention are many. In particular, the apparatus is particularly suited for dispensing and spreading slurry type materials which include fibrous material, such as, for example, straw, hay and the like. In particular, the apparatus is suitable for dispensing and spreading animal fodder and manure. By virtue of the fact that an isolating means is provided by isolating the dispensing rotor from the upstream portion of the container, the dispensing rotor can be run up to speed while it is disengaged from the material to be dispensed. This, thus permits the apparatus to be operated with a relatively low torque requirement. The torque required for running the dispensing rotor up to speed, is relatively low since the dispensing rotor is disengaged from the material, and once the dispensing rotor has been brought up to speed, and comes into engagement with the material in the container, the torque requirement is also relatively low.

Preferably, the isolating means comprises an isolating plate. This provides a particularly advantageous construction of apparatus.

Advantageously, the isolating means co-operates with the base and the side walls when in the closed position for isolating the dispensing rotor from the upstream portion of the container. This feature of the invention ensures good isolation between the dispensing rotor and the upstream portion of the container when the isolating means is in the closed position.

Preferably, a portion of the periphery of the isolating means substantially defines the inner transverse cross-section of the container. This further enhances isolating of the dispensing rotor from the upstream portion of the container.

In one aspect of the invention the isolating means is slidable transversely of the central axis of the container between the open and the closed positions. This feature provides a relatively advantageous construction of apparatus. Preferably, the isolating means is slidable upwardly from the closed position to the open position. This is a particularly advantageous construction of apparatus.

In one embodiment of the invention the isolating means is slidable in a pair of spaced apart tracks extending generally upwardly relative to the side walls.

Preferably, an operating means is provided for moving the isolating means between the closed position and the opened position. Advantageously, the operating means comprises an operating ram. Preferably, the operating ram is operably connected to the isolating means by an operating linkage.

Advantageously, the operating linkage comprises a first link member and a second link member pivotally connected together, a free end of one of the first link members being pivotally connected to the container, and a free end of the second link member being pivotally connected to the isolating means, the operating ram being pivotally connected to the container and to the first link member, the operating ram being connected to the first link member at a location intermediate and spaced apart from the pivotal connection connecting the link members together and the pivotal connection of the first link member to the container.

In a preferred embodiment of the invention an urging means is provided in the container for urging material in the container towards the dispensing rotor. The advantage of this feature of the invention is that it enables material in the container to be substantially continuously urged into engagement with the dispensing rotor.

Preferably, the urging means comprises a piston plate member located in the container and extending transversely of the central axis of the container, the piston member being movable longitudinally along the container from the upstream end to the downstream end thereof for urging the material towards the dispensing rotor. This arrangement of urging means provides a particularly advantageous form of the apparatus, which is also efficient.

Preferably, the urging means co-operates with the base and side walls of the container for retaining material within the container. Advantageously, a portion of the periphery of the urging means substantially defines the inner transverse cross-section of the container. Preferably, a drive means is provided for moving the urging means along the container. Advantageously, the drive means comprises a drive ram and a transmission linkage operably connecting the drive ram to the urging means.

In a preferred embodiment of the invention the transmission linkage comprises a first elongated link arm and a second elongated link arm pivotally connected together adjacent respective ends thereof, a free end of the first link arm being pivotally connected to the container adjacent the upstream end thereof and adjacent the base, a free end of the second link arm being pivotally connected to the urging means, the drive ram being pivotally connected to the first and second link arms intermediate the respective ends thereof for urging the respective free ends of the first and second link arms away from and towards each other for moving the urging means towards and away from the dispensing rotor, respectively.

Preferably, the second link arm forms with a third link arm a parallel linkage for moving the urging means along the container with rectilinear movement. Advantageously, the third link arm is pivotally connected to the urging means and to the first link arm. Preferably, the third link arm is pivotally connected to the urging means at a level above the pivotal connection of the second link arm to the urging means, and the third link arm is pivotally connected to the first link arm to a portion of the first link arm extending from the first link arm beyond the pivotal connection of the first and second link arms.

Advantageously, a pair of spaced apart third link arms are provided, one third link arm extending on respective opposite sides of the first link arm and being pivotally connected to the urging means on respective opposite sides of a vertical plane containing the central axis for stabilizing the urging means.

Preferably, the first link arm is pivotally connected to the container at a level lower than the base. The advantage of this feature of the invention is that it lowers the overall height of the apparatus. Preferably, the first link arm is cranked intermediate its ends for accommodating pivotal action of the first link arm relative to the base.

In one embodiment of the invention a rupturing means is provided for rupturing and dislodging compacted fibrous material from the dispensing rotor.

Preferably, the rupturing means is mounted on the urging means and extends from the urging means in a direction generally towards the dispensing rotor and co-operates therewith for rupturing and dislodging the compacted fibrous material as the urging means approaches the dispensing rotor.

Advantageously, the rupturing means is spaced apart from the dispensing rotor for all positions of the urging means.

In one aspect of the invention the rupturing means is axially offset from the rotational axis of the dispensing rotor. Preferably, the rupturing means is located towards one side of the rotational axis of the dispensing rotor.

In a preferred aspect of the invention the rupturing means is located so that it engages the compacted fibrous material as the material is moving in a downward direction towards the rupturing means.

In one embodiment of the invention the rupturing means comprises a rupturing member tapering from the urging means. Preferably, the rupturing member is of square shape transverse cross-section and terminates in a free end of square shape transverse cross-section. Advantageously, the rupturing means defines a central axis extending parallel to the central axis of the container, the central axis of the rupturing means lying in a horizontal plane which contains the central axis of the container.

In one embodiment of the invention the transverse width of the rupturing means adjacent the urging means is approximately equivalent to a quarter of the transverse width of the container on the horizontal plane containing the central axes of the container and the rupturing means.

Advantageously, the transverse width of the rupturing means at the free end thereof remote from the urging means is one eighth of the transverse width of the container on the horizontal plane containing the central axes of the container and the rupturing means.

In one embodiment of the invention the rupturing means is sufficiently close to the rotational axis of the dispensing rotor for engaging a build up of compacted fibrous material of cone shape on the dispensing rotor adjacent the rotational axis thereof.

In a preferred embodiment of the invention the base is of semi-circular cross-section, the axis of generation of the base extending longitudinally of the container and coinciding with the central axis of the container.

Preferably, the dispensing outlet is located in one of the side walls adjacent the downstream end wall. Advantageously, the dispensing outlet extends downwardly into portion of the base adjacent the side wall.

In a preferred aspect of the invention the dispensing outlet is formed by an elongated slot extending in a generally upwardly/downwardly direction.

Preferably, a closure means is provided for selectively closing the dispensing outlet.

In one embodiment of the invention a dispersing means is mounted adjacent but outside the dispensing outlet for dispersing material discharged through the dispensing outlet. Preferably, the dispersing means comprises a plurality of spaced apart dispersing bars inclined at an angle to the horizontal, the dispersing bars lying in a plane extending in a substantially upwardly/downwardly direction and in a generally upstream/downstream direction or at an angle thereto.

Advantageously, the dispersing bars incline upwardly in a generally upstream direction.

In one embodiment of the invention the dispersing bars extend in a direction away from the container in a generally downstream direction.

In another embodiment of the invention the dispersing bars are substantially parallel to each other.

Preferably, the dispersing bars extend from a mounting bar, the mounting bar being pivotally connected to the downstream end of the container about a pivot axis extending in a generally upward/downward direction for facilitating the angle which the dispersing bars make with the container in the upstream direction to be varied.

In one embodiment of the invention a locating means is provided for locating the dispersing bars at a desired angle relative to the container side in the upstream direction.

In a preferred embodiment of the invention the mounting bar extends vertically when viewed from one side of the container in a direction transversely of the central axis of the container, and is inclined in a generally upwardly outwardly direction relative to the container when viewed from an end of the container in a direction parallel to the central axis.

In one embodiment of the invention the dispensing rotor comprises a rotor disc rotatable about its geometrical central axis, at least two anchor means being provided on the rotor disc at spaced apart locations for anchoring an elongated first ligature extending between the anchor means, and at least one cutting means mounted on the first ligature for engaging the material in the container as the dispensing rotor rotates.

Preferably, each cutting means is slidably engagable with the first ligature.

Advantageously, each cutting means is mounted on a tubular mounting member having a bore extending therethrough for slidably engaging the first ligature. In one embodiment of the invention, a plurality of cutting means are provided on the first ligature, and spacer members are provided on the first ligature between respective cutting means for locating the cutting means of the first ligature. Preferably, each spacer member is a tubular spacer member having a bore extending therethrough for slidably engaging the first ligature. Advantageously, the bore of each tubular mounting member and each tubular spacer member is of square cross-section. Preferably, the first ligature is a chain.

In one embodiment of the invention a third anchor means is provided on the rotor disc, and a connecting means is provided on the first ligature intermediate the ends thereof for connecting the first ligature to a second ligature extending from the third anchor means. Advantageously, the connecting means slidably engages the first ligature.

Preferably, the connecting means comprises a tubular connecting member having a bore extending therethrough for slidably engaging the first ligature.

In one embodiment of the invention at least some of the tubular mounting members are formed with four walls defining the bore of square cross-section.

In another embodiment of the invention a cutting means is provided on at least one of the walls of each tubular mounting member.

In a further embodiment of the invention each cutting means comprises a cutting blade having a cutting edge.

In a still further embodiment of the invention a cutting blade is provided on each side wall of some of the tubular mounting members.

Preferably, each cutting blade extends diagonally across a corresponding wall from one corner to a diagonally opposite corner thereof.

In another embodiment of the invention at least one cutting blade is mounted on a corresponding wall of some of the tubular mounting members, the cutting blade extending substantially transversely thereof. Alternatively, a cutting disc extending completely around the tubular mounting member is provided on some of the tubular mounting members.

In an alternative embodiment of the invention the cutting disc is of substantially square shape.

Additionally, the invention provides apparatus for spreading material, the apparatus comprising an elongated container for the material extending from an upstream end to a downstream end and defining a longitudinally extending central axis, the container comprising a base, a pair of spaced apart side walls extending generally upwardly from the base and between the upstream and downstream ends, and a downstream end wall extending upwardly from the base between the side walls, a dispensing outlet from the container being located adjacent the downstream end thereof, a dispensing rotor mounted in the container at the downstream end, and being rotatable about a rotational axis which extends parallel to the central axis of the container for dispensing material from the container through the dispensing outlet, wherein a rupturing means is provided for rupturing and dislodging compacted fibrous material from the dispensing rotor.

Preferably, an urging means is provided in the container for urging material in the container towards the dispensing rotor.

Additionally, the invention provides apparatus for spreading material, the apparatus comprising an elongated container for the material extending from an upstream end to a downstream end and defining a longitudinally extending central axis, the container comprising a base, a pair of spaced apart side walls extending generally upwardly from the base and between the upstream and downstream ends, and a downstream end wall extending upwardly from the base between the side walls, a dispensing outlet from the container being located adjacent the downstream end thereof, a dispensing rotor mounted in the container at the downstream end, and being rotatable about a rotational axis which extends parallel to the central axis of the container for dispensing material from the container through the dispensing outlet, wherein a dispersing means is mounted adjacent but outside the dispensing outlet for dispersing material discharged through the dispensing outlet.

Preferably, the dispersing means comprises a plurality of spaced apart dispersing bars inclined at an angle to the horizontal, the dispersing bars lying in a plane extending in a substantially upwardly/downwardly direction and in a generally upstream/downstream direction or at an angle thereto.

Advantageously, the dispersing bars incline upwardly in a generally upstream direction, and extend in a direction away from the container in a generally downstream direction. Preferably, the dispersing bars are substantially parallel to each other.

In one embodiment of the invention the dispersing bars extend from a mounting bar, the mounting bar being pivotally connected to the downstream end of the container about a pivot axis extending in a generally upward/downward direction for facilitating the angle which the dispersing bars make with the container in the upstream direction to be varied to facilitate adjustment of the dispersion achieved by the dispersing means.

Preferably, a locating means is provided for locating the dispersing bars at a desired angle relative to the container side in the upstream direction.

Advantageously, the mounting bar extends vertically when viewed from one side of the container in a direction transversely of the central axis of the container, and is inclined in a generally upwardly outwardly direction relative to the container when viewed from an end of the container in a direction parallel to the central axis.

Further, the invention provides apparatus for spreading material, the apparatus comprising an elongated container for the material extending from an upstream end to a downstream end and defining a longitudinally extending central axis, the container comprising a base, a pair of spaced apart side walls extending generally upwardly from the base and between the upstream and downstream ends, and a downstream end wall extending upwardly from the base between the side walls, a dispensing outlet from the container being located adjacent the downstream end thereof, a dispensing rotor mounted in the container at the downstream end, and being rotatable about a rotational axis which extends parallel to the central axis of the container for dispensing material from the container through the dispensing outlet, wherein an urging means is provided in the container for urging material in the container towards the dispensing rotor, and a drive means is provided for moving the urging means along the container, the drive means being operably connected to the urging means by a transmission linkage, the transmission linkage comprising a first elongated link arm and a second elongated link arm pivotally connected together adjacent respective ends thereof, a free end of the first link arm being pivotally connected to the container adjacent the upstream end thereof and adjacent the base, a free end of the second link arm being pivotally connected to the urging means.

The advantage of this feature of the invention is that it provides a relatively efficient means of moving the urging means along the container.

Preferably, the first link arm is pivotally connected to the container at a level lower than the base, and extends in a generally upwardly direction relative to the base. The advantage of this feature of the invention is that it enables the overall height of the wagon which in general is determined by the height of the transmission linkage to be kept to a minimum.

In one embodiment of the invention, the first link arm is cranked intermediate its ends for accommodating pivotal action of the first link arm relative to the base for moving the urging means along the container.

Further, the invention provides apparatus for spreading material, the apparatus comprising an elongated container for the material extending from an upstream end to a downstream end and defining a longitudinally extending central axis, the container comprising a base, a pair of spaced apart side walls extending generally upwardly from the base and between the upstream and downstream ends, and a downstream end wall extending upwardly from the base between the side walls, a dispensing outlet from the container being located adjacent the downstream end thereof, a dispensing rotor mounted in the container at the downstream end, and being rotatable about a rotational axis which extends parallel to the central axis of the container for dispensing material from the container through the dispensing outlet, wherein the dispensing rotor comprises a rotor disc rotatable about its geometrical central axis, at least two anchor means being provided on the rotor disc at spaced apart locations for anchoring an elongated first ligature extending between the anchor means, and at least one cutting means mounted on the first ligature for engaging the material in the container as the dispensing rotor rotates. Preferably, each cutting means is slidably engagable with the first ligature. Advantageously, each cutting means is mounted on a tubular mounting member having a bore extending therethrough for slidably engaging the first ligature.

The invention will be more clearly understood from the following description of a preferred embodiment thereof given by way of example only, with reference to the accompanying drawings, in which:

BRIEF DESCRIPTION OF THE DRAWINGS

FIG. 5b is a perspective view of a detail of the portion of FIG. 5, FIG. 7 is a perspective view of another portion of the wagon of FIG. 1, FIG. 8 is a perspective view of the portion of FIG. 7 illustrating part of the wagon in a different position, FIG. 11 is an end elevational view of a detail of the wagon of FIG. 1, FIG. 18 is an end elevational view of a further detail of the wagon of FIG. 1, FIG. 19 is a side elevational view of the detail of FIG. 18, FIG. 21 is a side elevational view of a further detail of the wagon of FIG. 1, FIG. 22 is a plan view of the detail of FIG. 21, FIG. 25 is a side elevational view of a further detail of the wagon of FIG. 1, FIG. 26 is a plan view of the detail of FIG. 25, FIG. 27 is an end elevational view of another detail of the wagon of FIG. 1, FIG. 28 is a plan view of the detail of FIG. 27, FIG. 29 is an end elevational view of a further detail of the wagon of FIG. 1, FIG. 30 is a side elevational view of another detail of the wagon of FIG. 1, and FIG. 31 is a plan view of the detail of FIG. 30.

DETAILED DESCRIPTION OF THE INVENTION

Figure 1:
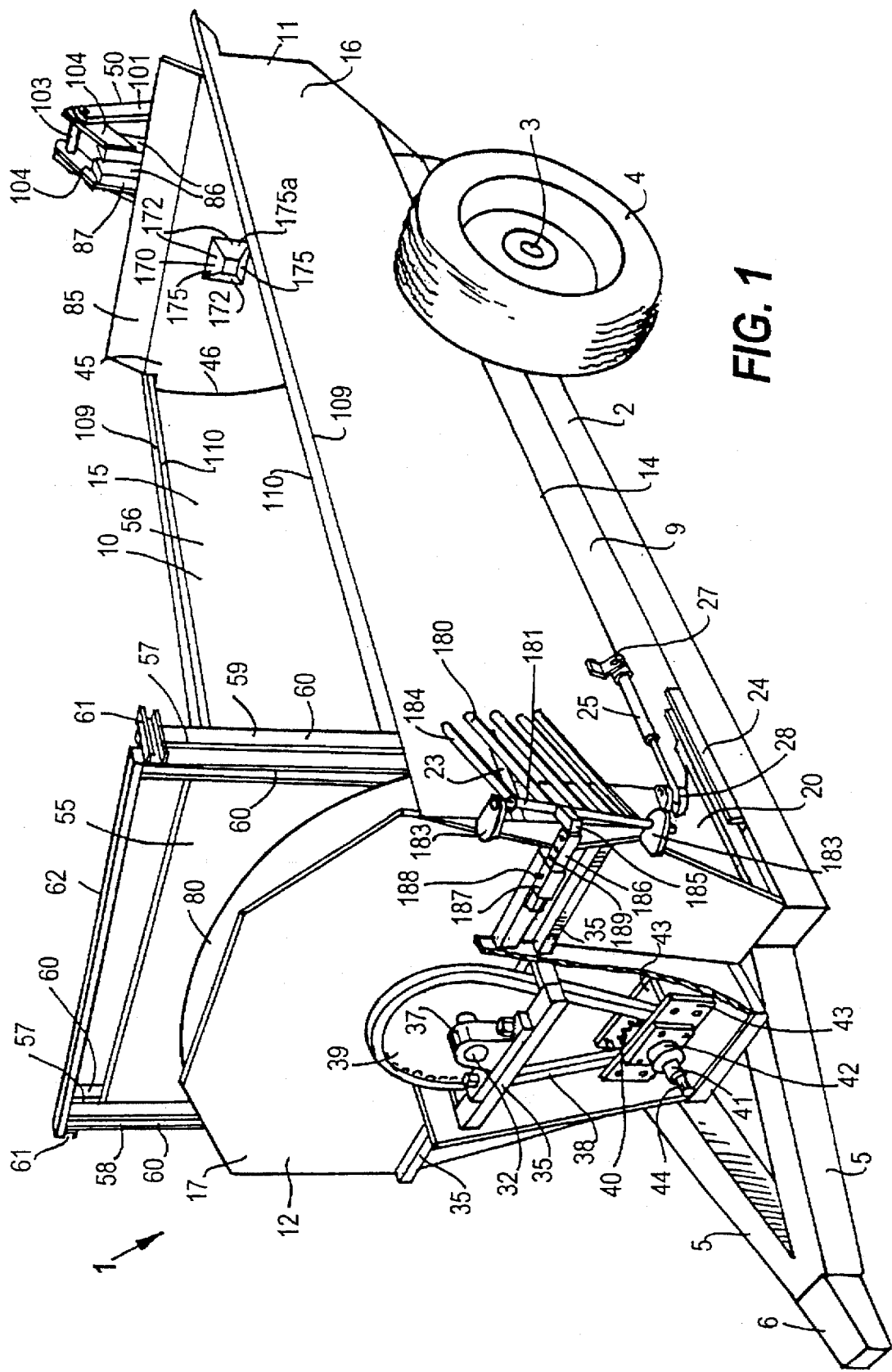
FIG. 1 is a perspective view of a spreader wagon according to the invention.

Referring to the drawings and initially to FIGS. 1 to 19 there is illustrated apparatus, in this case, a spreader wagon according to the invention indicated generally by the reference numeral 1 for spreading material, typically, animal fodder, manure, slurry and the like. The spreader wagon 1 is suitable for hitching to a tractor or other towing vehicle (not shown). The spreader wagon 1 comprises a chassis 2 supported on an axle 3 which rotatably carries a pair of ground engaging wheels 4. Forwardly extending members 5 extend from the chassis 2 and terminate in a tow hitch 6 for hitching the wagon 1 to the tractor or other towing vehicle.

An elongated container 10 for the fodder, slurry or the like is carried on the chassis 2 by a pair of side plate members 9 which extend downwardly from the container 10 to the chassis 2. The container 10 extends from an upstream end 11 to a downstream end 12 and comprises a base 14 of semi-circular cross-section and a pair of spaced apart side walls 15 and 16 extending upwardly from the base 14. A downstream end wall 17 extends upwardly from the base 14 and between the side walls 15 and 16 at the downstream end 12 of the container 10. The base 14, side walls 15 and 16 and the end wall 17 are of steel plate material. The base 14 defines an axis of generation which coincides with and forms a longitudinally extending central axis 18 of the container 10.

A dispensing outlet 19 through which material from the container 10 is discharged is provided at the downstream end 12 of the container 10. The dispensing outlet 19 is formed by an elongated slot in the side wall 16 which extends downwardly into the base 14 adjacent the end wall 17. A closure means, namely, a closure plate 20 of steel plate material slidable in upper and lower tracks 23 and 24, respectively, selectively closes the dispensing outlet 19. An hydraulic ram 25 pivotally connected to the base 14 and the closure plate 20 by brackets 27 and 28, respectively, slides the closure plate 20 in the tracks 23 and 24 between an open position (see FIG. 7) and a closed position (see FIG. 8).

A dispensing rotor 30 also according to the invention is rotatably mounted within the container 10 adjacent the downstream end 12 for dispensing material from the container 10 through the dispensing outlet 19. The dispensing rotor 30 comprises a circular rotor disc 31 of steel plate material which is rigidly carried on a rotor shaft 32 which extends from the container 10 through an opening 34 in the downstream end wall 17. A support framework 35 of box section steel extending transversely of and secured to the downstream end wall 17 carries bearings 36 and 37 which rotatably carry the rotor shaft 32. A seal (not shown) seals the rotor shaft 32 through the opening 34. The rotational axis of the rotor shaft 32 coincides with the geometrical center of the rotor disc 31 and also coincides with the central axis 18 of the container 10. Accordingly, the central and rotational axes of the rotor disc 31 coincide with the central axis 18 of the container 10. The dispensing rotor 30 is described in more detail below.

A transmission means for transmitting drive from a power take-off shaft or the like of a tractor to the rotor shaft 32 for rotating the dispensing rotor 30 in the direction of the arrow A for dispensing material through the dispensing outlet 19, comprises a chain 38 around a sprocket 39 which is fast on the shaft 32 and a sprocket 40 fast on a shaft 41. Bearings 42 mounted on a pair of support plates 43, which are in turn carried by the forwardly extending members 5 rotatably carry the shaft 41. A splined end 44 of the shaft 41 is provided for engaging a drive shaft (not shown) from a power take-off shaft (not shown) of a tractor or the like.

An urging means for urging material in a generally downstream direction in the container 10 towards the dispensing rotor 30 comprises a piston plate member 45 located in the container 10 and extending transversely of the container 10. The piston plate member 45 is vertically disposed and is slidable longitudinally within the container 10 with rectilinear movement from the upstream end 11 to the downstream end 12 for urging the material into engagement with the dispensing rotor 30. The piston plate member 45 is of steel plate material and a portion 46 of the peripheral edge of the piston 45 substantially defines the transverse cross-section of the container 10 so that the piston member 45 also acts to retain material in the container 10. A seal 47 extends around the peripheral portion 46 for sealing the piston member 45 against the base 14 and the side walls 15 and 16 in the container 10.

A drive means for urging the piston member 45 between the upstream and downstream ends 11 and 12, respectively, comprises a double acting hydraulic drive ram 48 operably connected to the piston member 45 by a transmission linkage 50 which is described in detail below. The transmission linkage 50 is pivotally connected by a pivot mounting bracket 51 to the base 14 at the upstream end 11 and to the piston member 45 by a pivot shaft 52 carried on the piston member 45 as will be described below.

Figure 2:
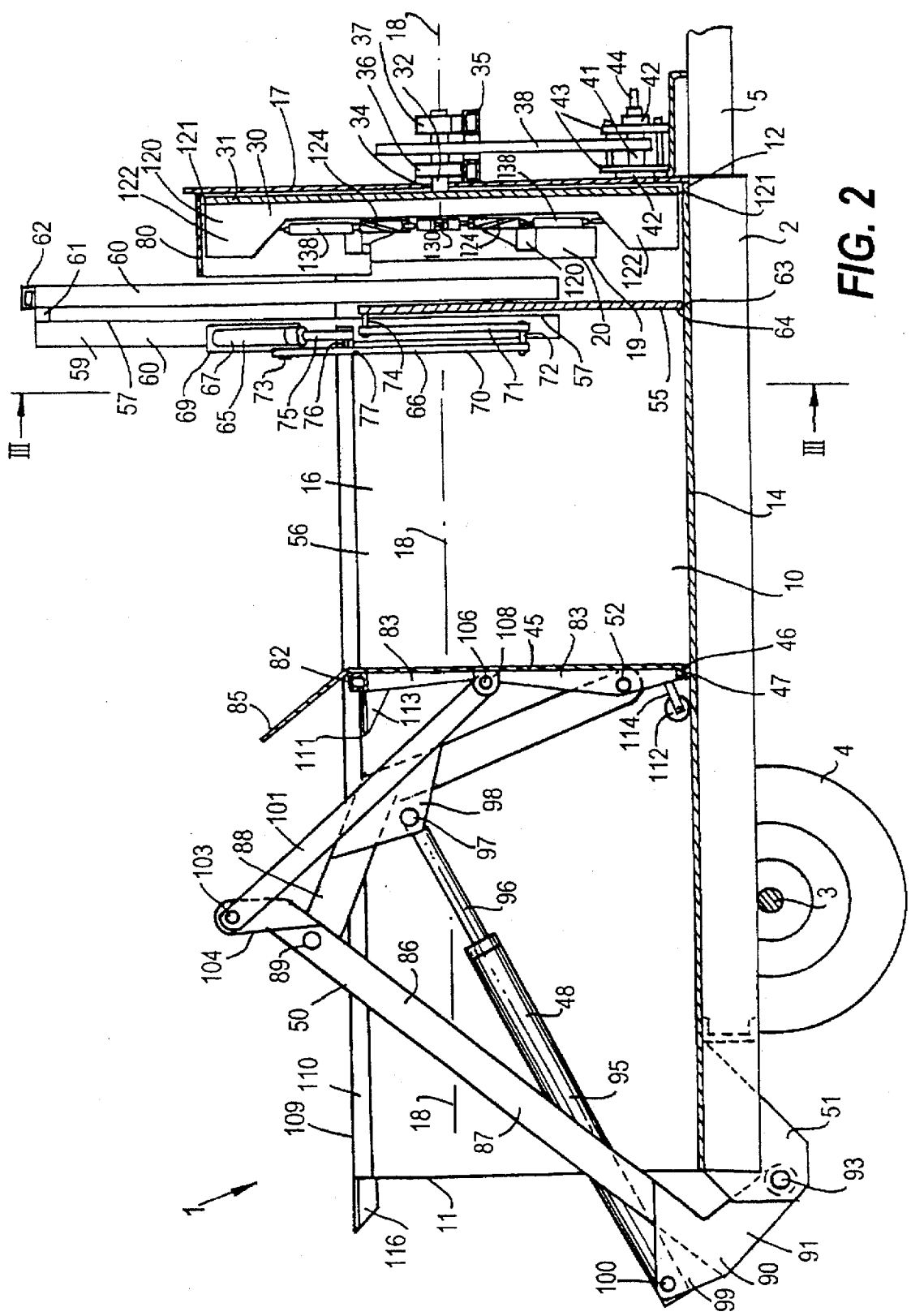
FIG. 2 is a sectional side elevational view of the wagon of FIG. 1.
Figure 3:
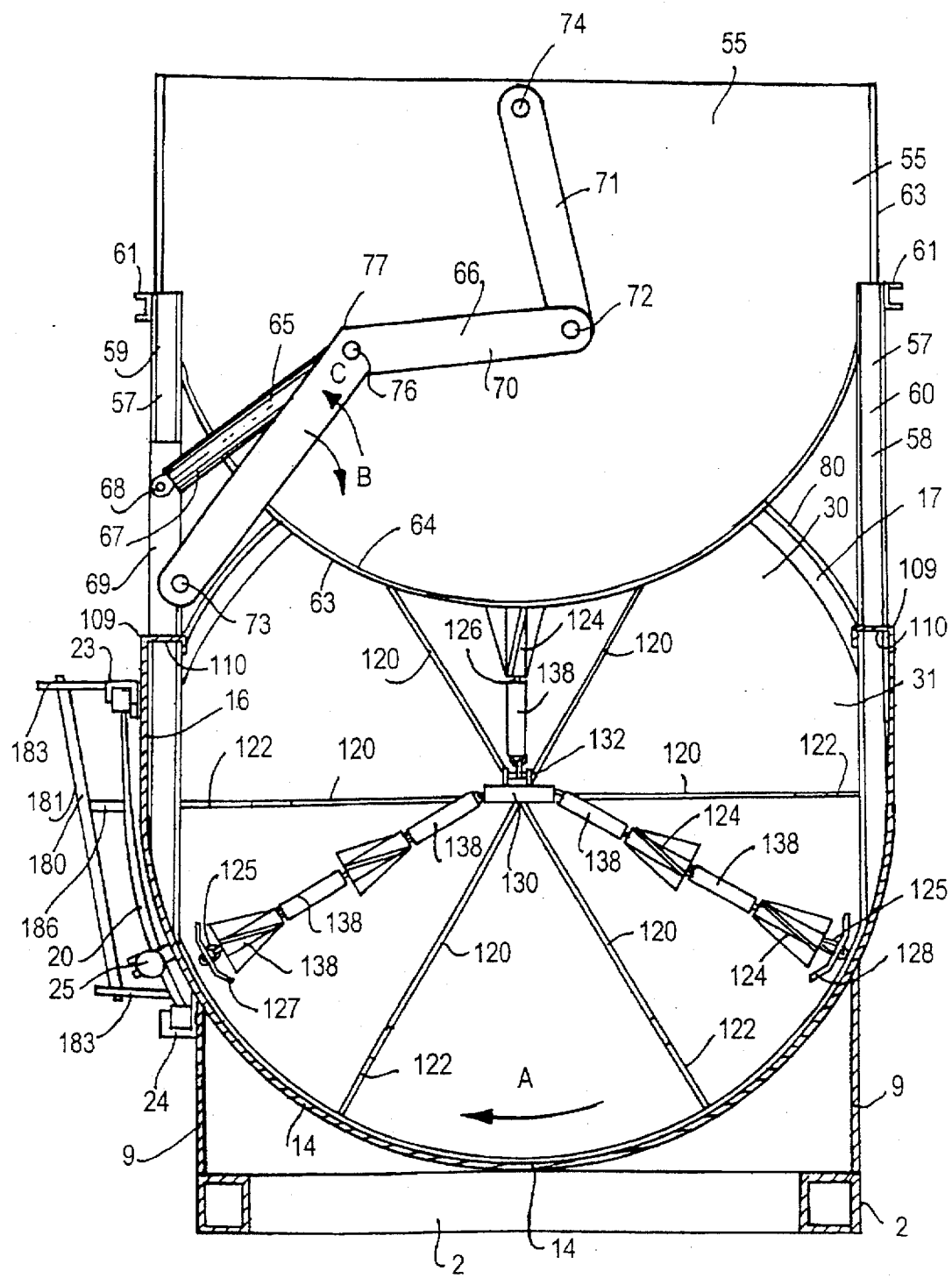
FIG. 3 is a sectional end view of the wagon of FIG. 1 on the line III—III of FIG. 2.
Figure 4:
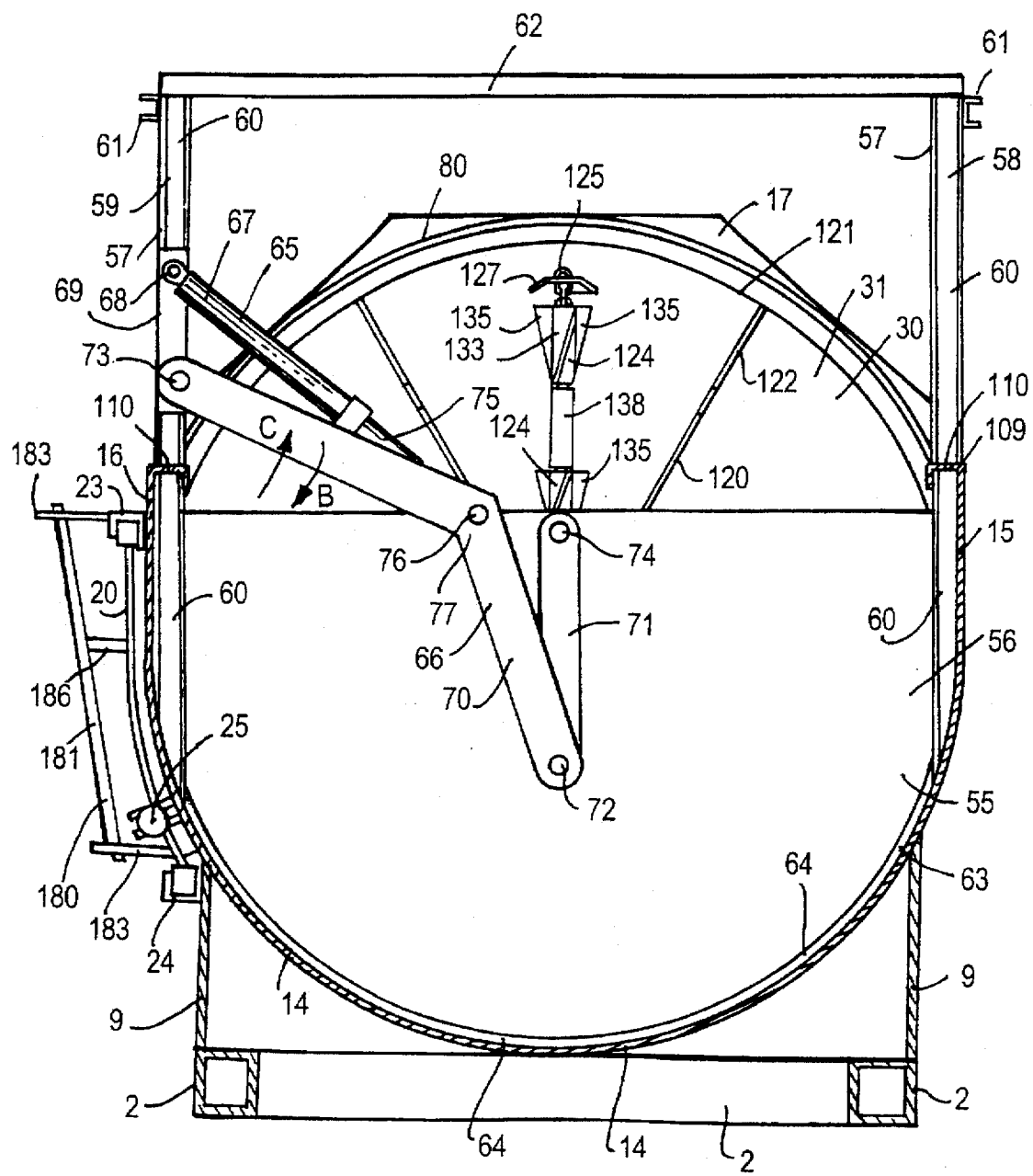
FIG. 4 is view similar to FIG. 3 with a portion of the wagon of FIG. 1 in a different position.
Figure 5:
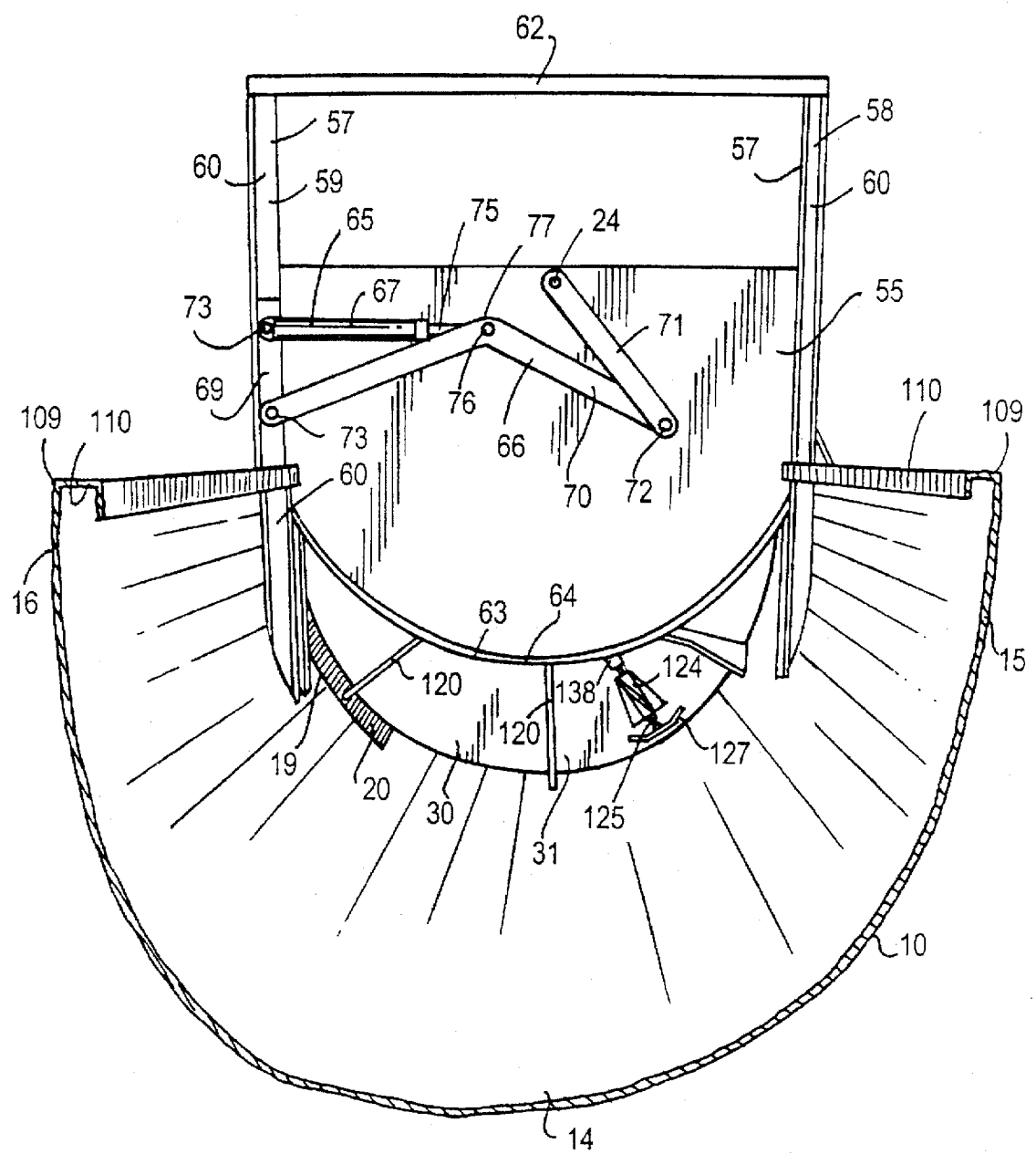
FIG. 5 is a perspective view of portion of the wagon of FIG. 1.
Figure 5A:
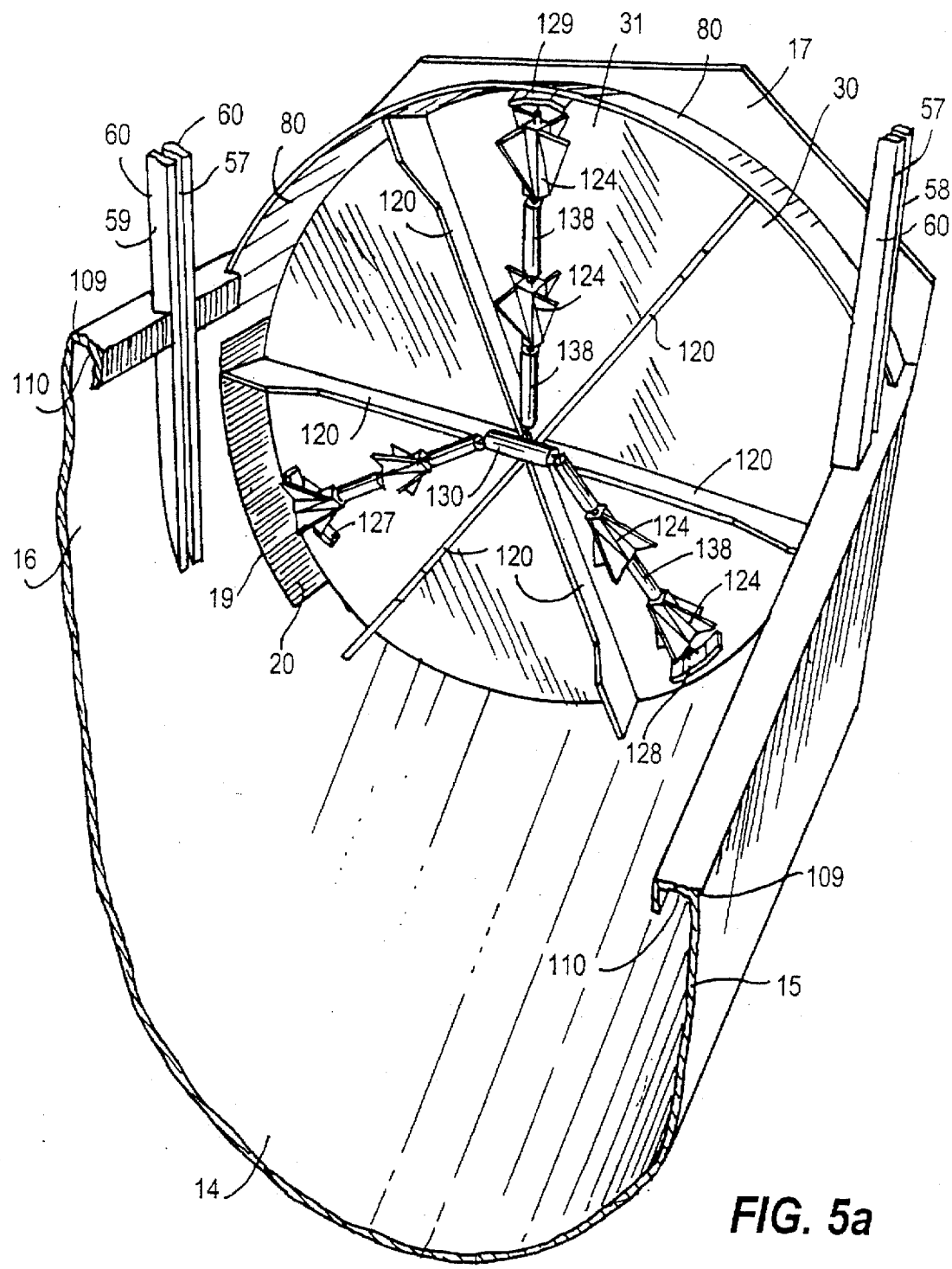
FIG. 5a is another perspective view of the portion of FIG. 5.
Figure 6:
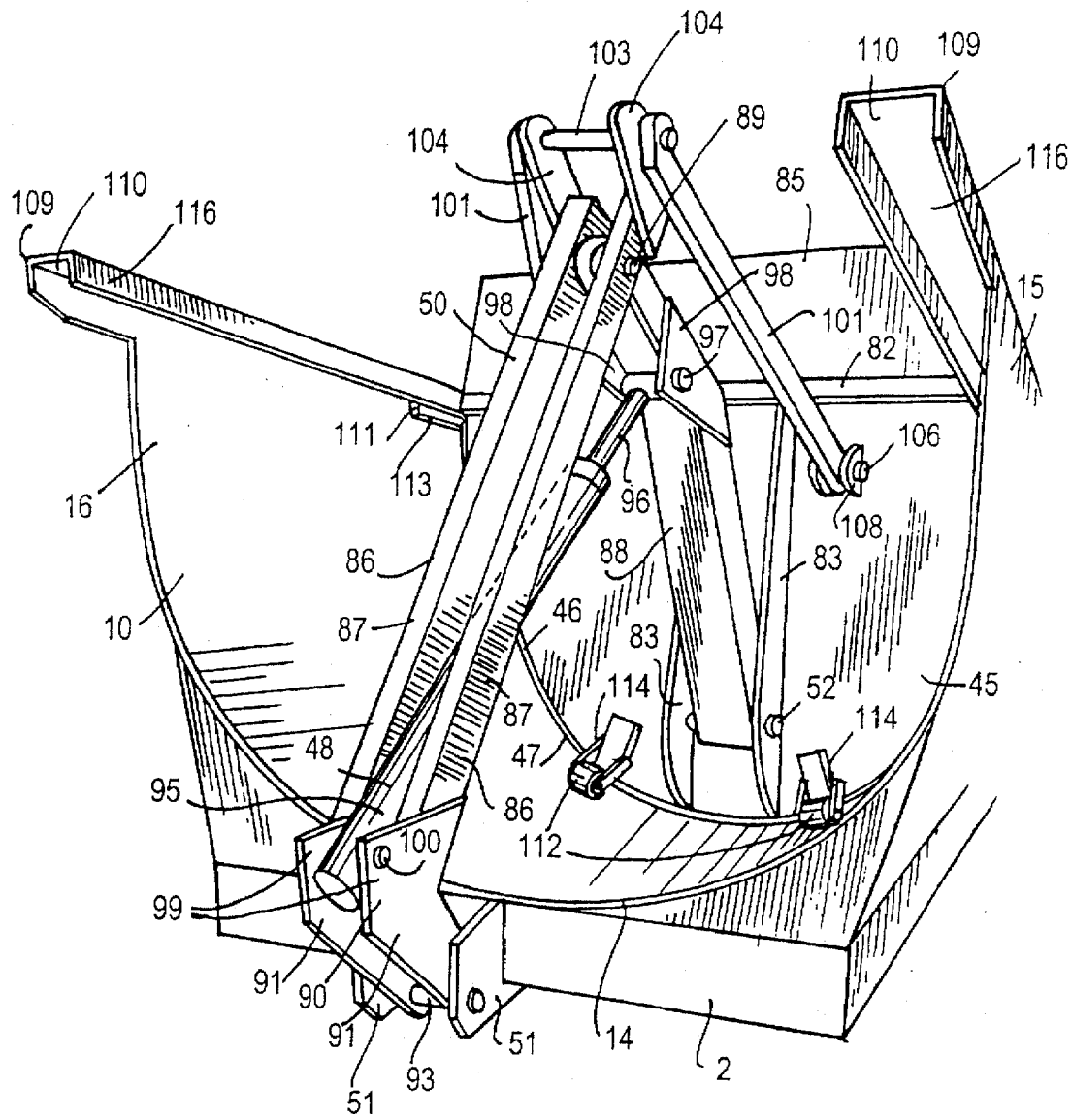
FIG. 6 is a perspective view of another portion of the wagon of FIG. 1.
Figure 9:
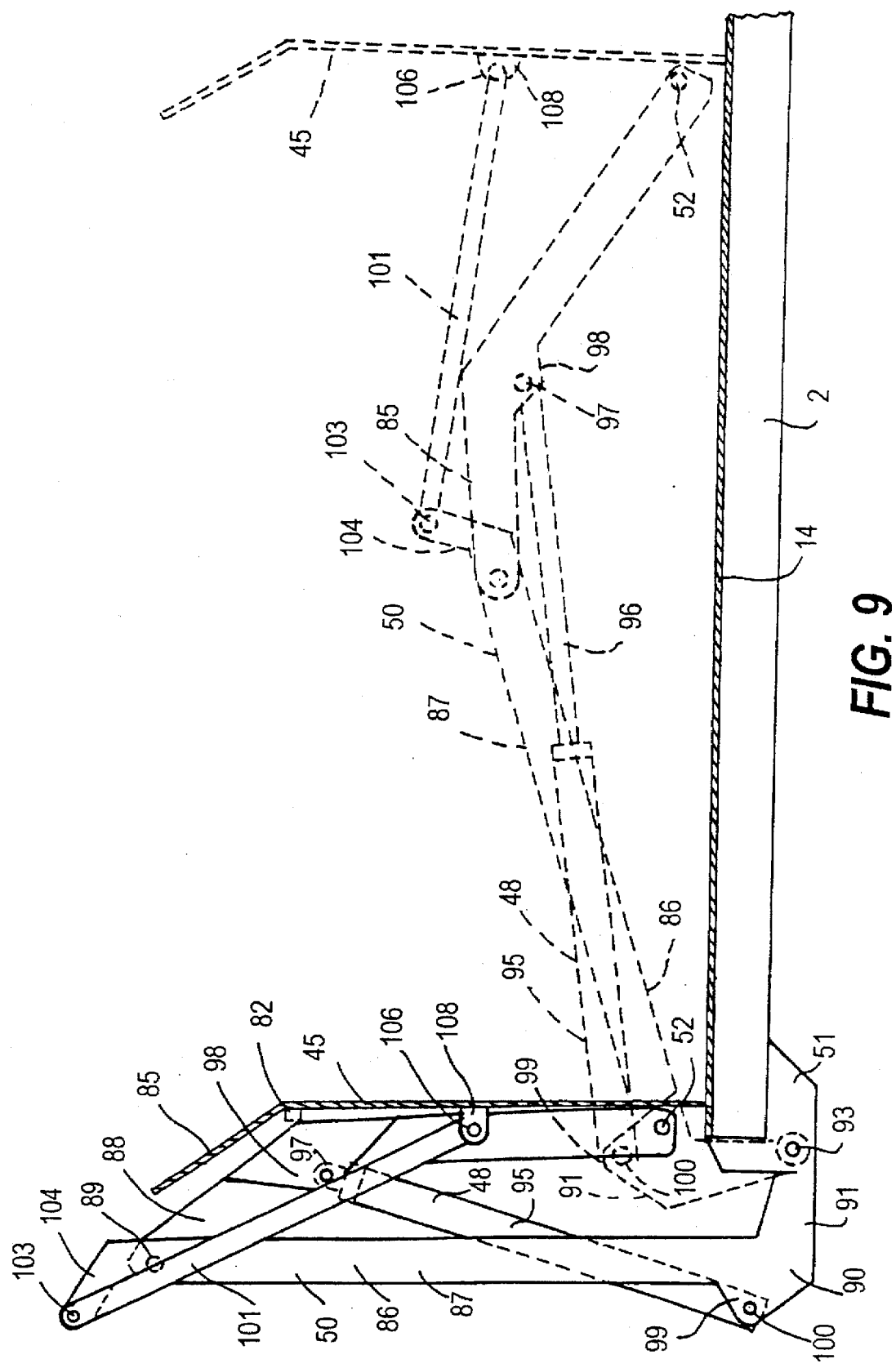
FIG. 9 is a sectional side elevational view of portion of the wagon of FIG. 1 illustrating a portion of the wagon in two different positions, one illustrated in full lines and the other illustrated in broken lines.
Figure 10:
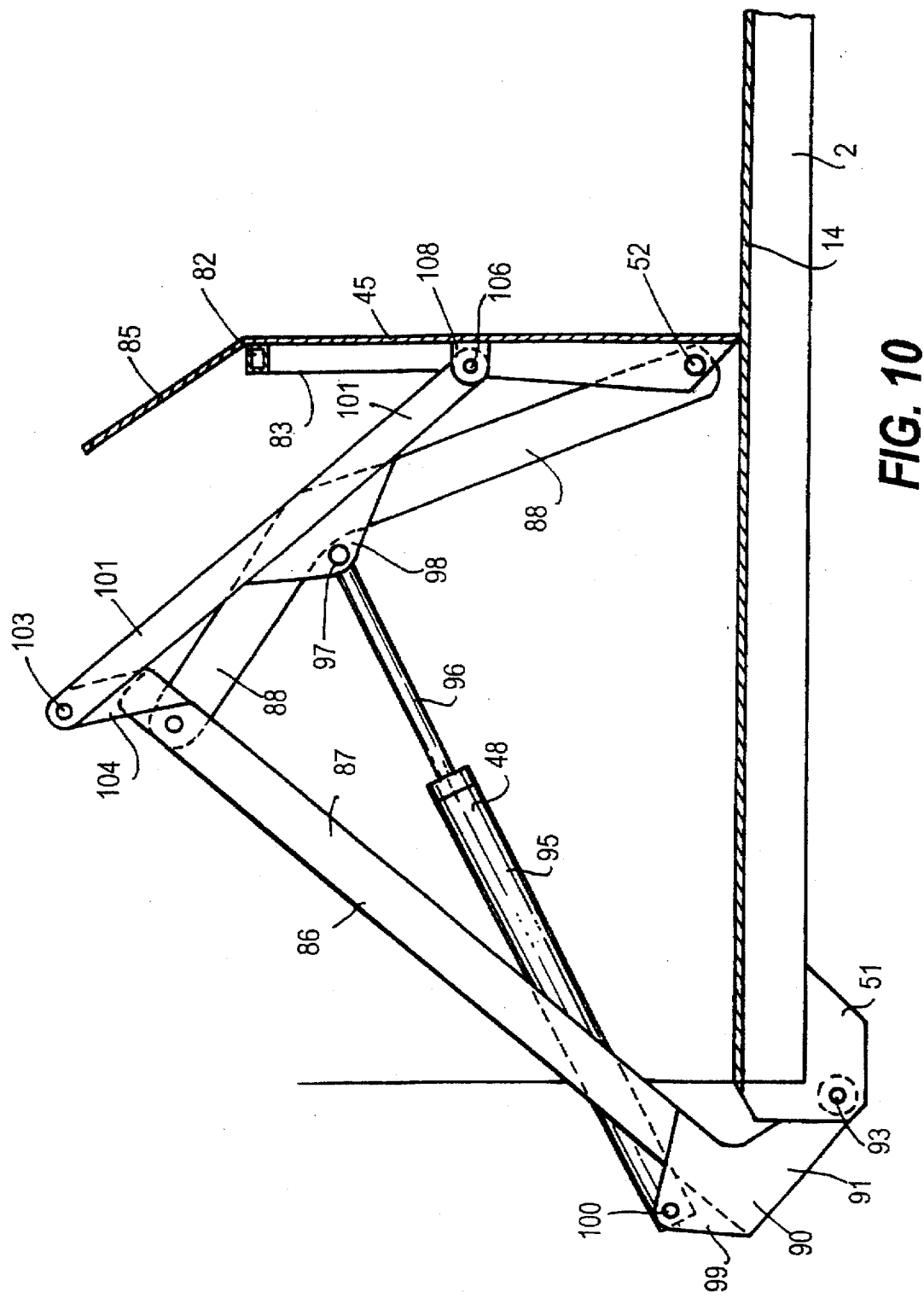
FIG. 10 is a view similar to FIG. 9 of the portion of FIG. 9 showing part of the portion of FIG. 9 in an intermediate position.

An isolating means comprising an isolating plate 55 of steel plate material is located in the container 10 adjacent the downstream end 12 on the upstream side of the dispensing rotor 30 for selectively isolating the dispensing rotor 30 from a portion 56 of the Container 10 upstream of the isolating plate 55. In this way the dispensing rotor may be isolated from the material in the upstream portion 56 of the container 10 until the dispensing rotor 30 has been run up to full speed, thus enabling the dispensing rotor 30 to be run up to speed in an unloaded condition with minimum torque requirements. The isolating plate 55 extends transversely of the container 10 and is slidable vertically in tracks 57 from a closed position illustrated in FIGS. 2 and 4 isolating the dispensing rotor 30 from the upstream portion 56 of the container 10 to an open position illustrated in FIG. 3 with the dispensing rotor 30 communicating with the upstream portion 56 of the container 10.

The tracks 57 are formed by pairs 58 and 59 of upstanding members 60 of channel section steel which are mounted on the side walls 15 and 16, respectively, in the container 10 and extend upwardly above the side walls 15 and 16. Tie members 61 also of channel section steel join the upstanding members 60 of the respective pairs 58 and 59. A top cross member 62 of box section steel joins the pairs 58 and 59 of upstanding members 60.

A portion 63 of the periphery of the isolating plate 55 substantially defines the internal cross-section of the container 10 and sealably engages and co-operates with the base 14 and side walls 15 and 16 for substantially sealably isolating the dispensing rotor 30 from the upstream portion 56 of the container 10 to prevent the ingress of liquid and slurry type material from the upstream portion 56 to the dispensing rotor 30 when the isolating plate 55 is in the closed position. A sealing member 64 of flexible rubber like plastics material extends around the peripheral portion 63 for sealably engaging the base 14 and the side walls 15 and 16. The tracks 57 are arranged so that the isolating plate 55 is located relatively closely to the dispensing rotor 30 in the closed position, but is sufficiently spaced apart from the dispensing rotor 30 to avoid any damage to the isolating plate 55 which could be caused by the dispensing rotor 30.

An operating means for moving the isolating plate 55 between the open and closed positions comprises an hydraulic operating ram 65 which operates the isolating plate 55 by an operating linkage 66. A housing 67 of the ram 65 is pivotally connected to one of the upstanding members 60 of the pair 58 by a pivot pin 68 on a bracket 69 which is mounted on one of the members 60. The operating linkage 66 comprises a first link member 70 and a second link member 71 which are pivotally connected together by a pivot pin 72. The first link member 70 is cranked at 77, and is pivotally connected to the bracket 69 by a pivot pin 73. The second link member 71 is pivotally connected to the isolating plate 55 by a pivot pin 74. A piston rod 75 of the operating ram 65 is pivotally connected to the first link member 70 at the cranked portion 77 by a pivot pin 76 so that as the piston rod 75 of the operating ram 65 is extended from the housing 67 the first link member 70 is pivoted in the direction of the arrow B for lowering the isolating plate 55 into the closed position. Retraction of the piston rod 75 pivots the first link member 70 in the direction of the arrows C for raising the isolating plate 55 into the open position.

A cowling 80 of steel plate material and of arcuate shape is welded to the side walls 15 and 16 and the end wall 17, and extends in a generally downstream direction over the dispensing rotor 30 to prevent discharge of material by the dispensing rotor over the side walls 15 and 16.

Returning to the piston member 45, the piston member 45 is of steel plate material and is transversely reinforced by a horizontal transverse reinforcing member 82 of box section steel. A pair of spaced apart reinforcing members 83 of steel plate material extend vertically downwardly from the reinforcing member 82 to the lower periphery 46 of the piston member 45. The reinforcing members 83 are equi-spaced on opposite sides of the vertical plane extending through the central axis 18. An upper portion 85 of the piston member 45 extending above the horizontal reinforcing member 82 is inclined rearwardly upwardly for directing material into the container 10 during filling thereof.

The transmission linkage 50 comprises a first link arm 87 and a second link arm 88 which are pivotally connected together by a pivot pin 89. The first link arm 87 is provided by a pair of spaced apart interconnected members 86 which are cranked at 90. Portions 91 extend downwardly from the cranked area 90 of each member 86 to a position below the base 14 and are pivotally connected to the container 10 by the pivot mounting bracket 51 which carries a pivot pin 93 which in turn pivotally engages the portions 91. The second link arm 88 is pivotally connected to the piston member 45 by the pivot shaft 52 which extends between and is carried by the vertical reinforcing members 83. The drive ram 48 comprises a housing 95 and a piston rod 96 extending from the housing 95. The piston rod is pivotally connected to the second link arm 88 by a pivot pin 97 carried by a pair of brackets 98 located intermediate the pivot shaft 52 and the pivot pin 89 at the respective ends of the second link arm 88. The housing 95 of the drive ram 48 extends between the members 86 of the first link arm 87 and is pivotally connected to the first link arm 87 adjacent the cranked area 90 by a pair of brackets 99 extending rearwardly from the members 86, which carry a pivot pin 100, which pivotally engages the housing 95. Accordingly, on extension of the drive ram 48, the piston member 45 is urged in the downstream direction along the container 10, and on retraction of the drive ram 48 the piston member 45 is urged in the upstream direction towards the upstream end 11.

A parallel linkage formed by the second link arm 88 and a pair of spaced apart third link arms 101 constrain the piston member 45 to move along the container 10 between the upstream end 11 and the downstream end 12 with rectilinear motion. The third link arms 101 are pivotally connected to the first link arm 87 by a pivot pin 103 which is carried by brackets 104 on the members 86 of the first link arm 87 which extends beyond the pivot pin 89. One third link arm 101 is provided on each side of the first link arm 87. The third link arms 101 diverge outwardly from the first link arm 87 and are pivotally connected to the piston member 45 by pivot pins 106 carried by brackets 108, secured to the piston member 45 at spaced apart locations, which are equi-spaced on opposite sides of the vertical reinforcing members 83 for stabilizing the piston member 45.

The side walls 15 and 16 are folded inwardly at 109 to form longitudinally extending tracks 110 for slidably engaging corresponding skid plates 111 carried on the piston member 45 for preventing upward movement of the piston member 45 in the container 10, and thereby retaining the piston member 45 in sealable engagement with the base 14. The skid plates 111 are of low friction teflon plastics material and are carried on skid mounting brackets 113 secured to the piston member 45. Extension tracks 116 accommodate the skid plates 111 when the piston member 45 is at the upstream end of the container 10. A pair of spaced apart guide rollers 112 which are equi-spaced on opposite sides of the vertical reinforcing members 83 are carried on brackets 114 secured to the piston member 45 and rollably engage the base 14 for guiding and carrying the piston member 45 along the base 14 to maintain the peripheral edge 46 spaced apart above the base 14 to avoid any danger of the piston member 45 bearing on the base 14. However, at the same time the guide rollers 112 maintaining the piston member 45 sufficiently close to the base 14 so that the sealing member 47 forms an adequate seal between the piston member 45 and the base 14, and the side walls 15 and 16.

Returning now to the dispensing rotor 30, and referring in particular to FIGS. 11 to 19, six radially extending ribs 120 extend from the center of the rotor disc 31 to the peripheral edge 121 thereof at equi-spaced intervals of 60° for engaging material in the container 10 and for discharging the material through the dispensing outlet 19 as the dispensing rotor 30 rotates in the direction of the arrow A. The ribs 120 are wider at their peripheral ends 122 than towards the center of the rotor disc 31 for discharging the material. The radius of the disc 31 and the radius of the ribs 120 is just less than the internal radius of generation of the base 14 so that the rotor disc 31 and the ribs 120 co-operate with the base 14 for dispensing material through the dispensing outlet 18. In this embodiment of the invention the radius of the rotor disc 31 is approximately 3 mm less than the internal radius of the base 14. This, thus leaves a clearance of approximately 3 mm between the base 14 and the peripheral edge 121 and ribs 120 of the rotor disc 31. It is believed that the closer the clearance between the base 14 and the peripheral edge 121 and the ribs 120 of the rotor disc 31 can be maintained within reason, the better will be the results. It is, however, envisaged that adequate results would be achieved with a clearance of up to 50 mm between the inner surface of the base 14 and the peripheral edge 121 and ribs 120, although, preferably, the clearance should not exceed 30 to 40 mm.

Cutting means for cutting and ripping portions of fibrous material from the material in the container 10 for discharge through the dispensing outlet 19 comprises a plurality of cutting members 124 carried on ligatures, namely, first and second chains 125 and 126, respectively. Anchor means provided by three anchor brackets 127, 128 and 129 are located at 120° intervals around the peripheral edge 121 of the rotor disc 31 for releasably anchoring the first and second chains 125 and 126 to the rotor disc 31. The anchor brackets 127, 128 and 129 are located equispaced between adjacent ribs 120. The first chain 125 is releasably anchored to and extends between the anchor brackets 127 and 128 while the second chain 126 is releasably anchored to the anchor bracket 129 and is connected to the first chain 125 by a connecting means, namely, a connecting member 130 of tubular square box section steel. A bore 131 of the connecting member 130 slidably engages the first chain 125. An eye bracket 132 releasably engages a shackle 139 on the second chain 126 for connecting the second chain 126 to the connecting member 130. The first and second chains 125 and 126 are sized and tensioned so that the connecting member 130 is located substantially adjacent the center of the rotor disc 31. Securing pins (not shown) secure the ends of the chains 125 and 126 to the anchor brackets 127, 128 and 129, respectively. The chains 125 and 126 are tensioned by tightening the second chain 126.

Each cutting member 124 comprises a mounting member 133 of tubular square box section steel having a bore 134 which slidably engages the corresponding chain 125 or 126. Four cutting blades 135 are provided on each mounting member 133, one blade being provided on each side 136 of the mounting member 133. The cutting blades 135 extend diagonally across the respective sides 136 of the mounting members 133 and terminate in a cutting edge 137 which extends in a general radial direction relative to the rotor disc 31. The cutting edges 137 diverge outwardly of the sides 136 towards the peripheral edge 121 of the rotor disc 31. Spacer members 138 of tubular square box section steel, which are of similar cross-section to the mounting members 133 slidably engage the respective chains 125 and 126 for locating and spacing the cutting members 124 along the chains 125 and 126.

Figure 20:
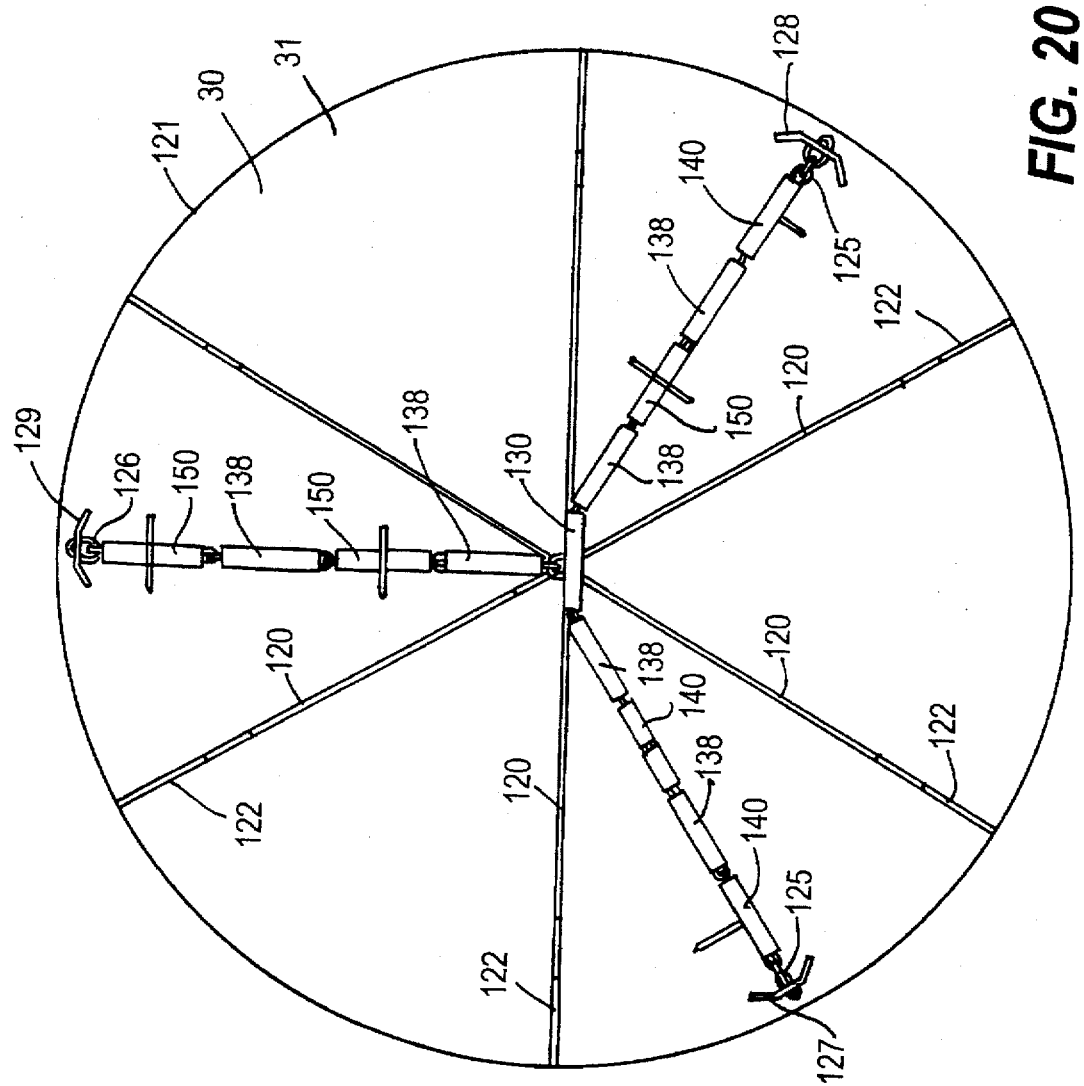
FIG. 20 is an end elevational view of another detail of the wagon of FIG. 1.
Figure 12:
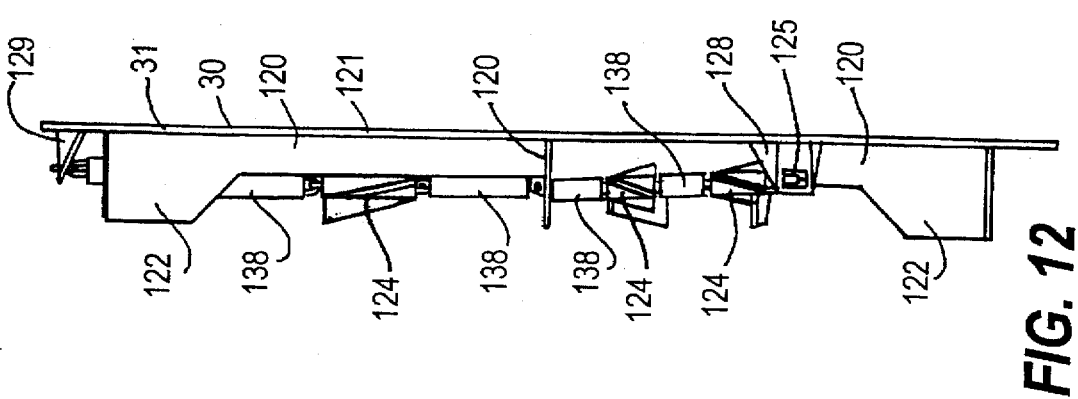
FIG. 12 is a side elevational view of the detail of FIG. 11.
Figure 13:
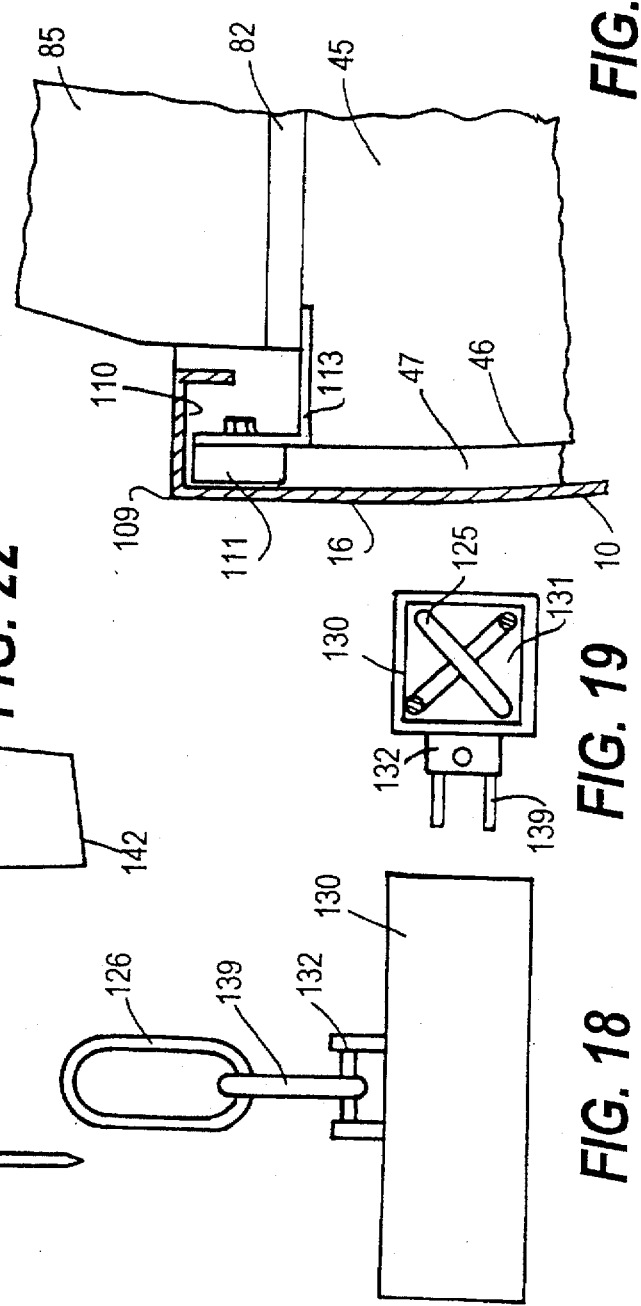
FIG. 13 is a sectional end elevational view of another detail of the wagon of FIG. 1.
Figure 14:
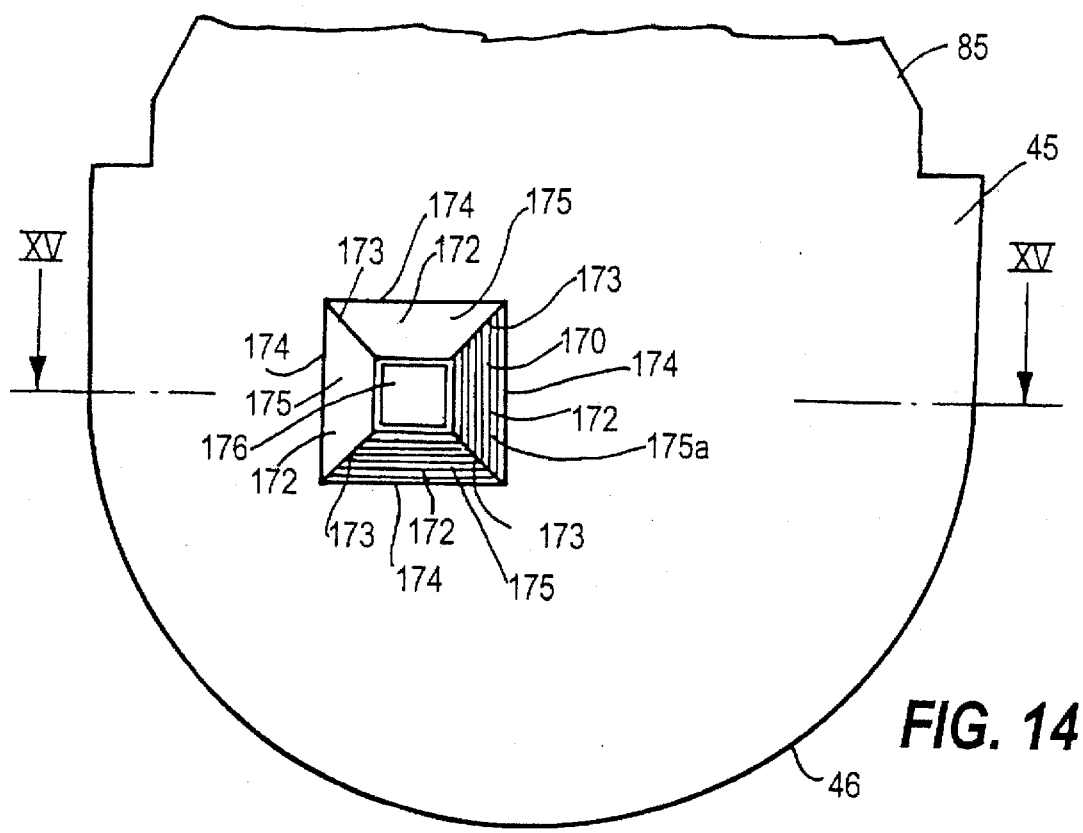
FIG. 14 is an end elevational view of a further detail of the wagon of FIG. 1.
Figure 15:
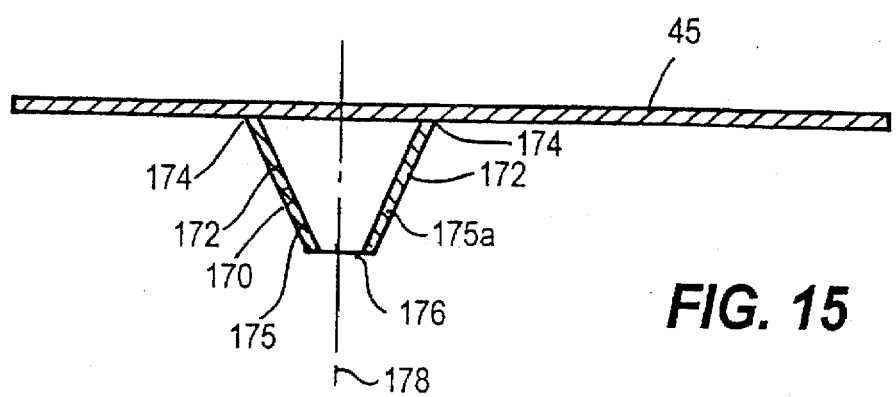
FIG. 15 is a sectional plan view on the line XV—XV of the detail of FIG. 14.
Figure 24:
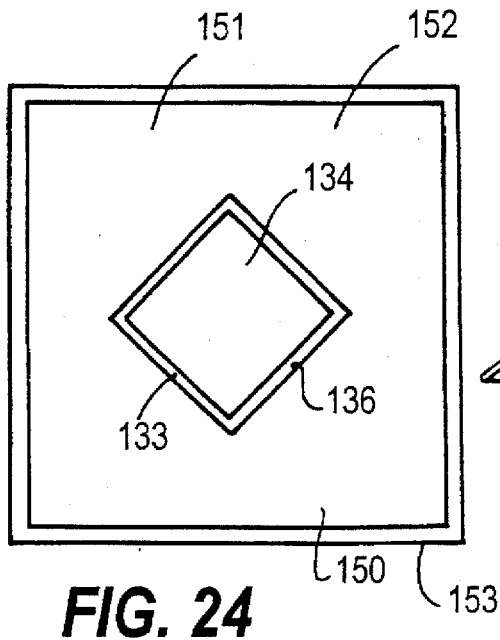
FIG. 24 is a plan view of the detail of FIG. 23.
Figure 17:
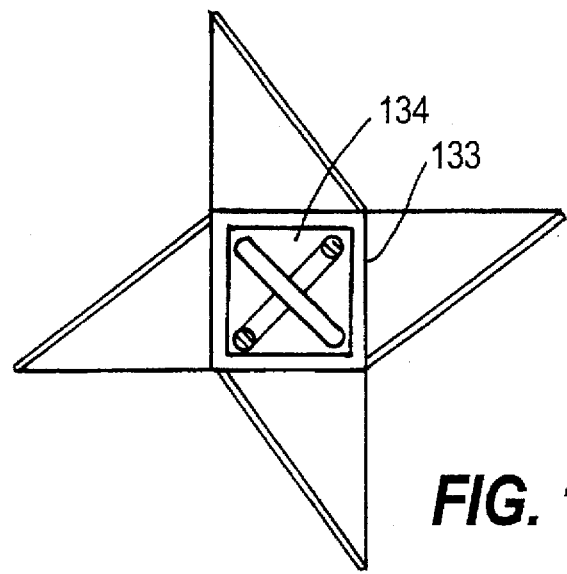
FIG. 17 is a plan view of the detail of FIG. 16.
Figure 23:
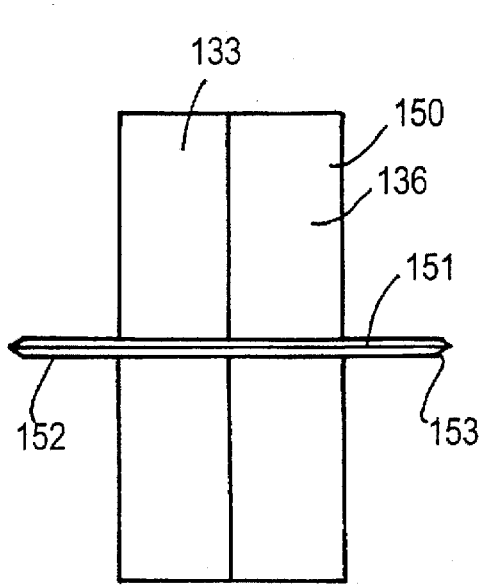
FIG. 23 is a side elevational view of a further detail of the wagon of FIG. 1.
Figure 16:
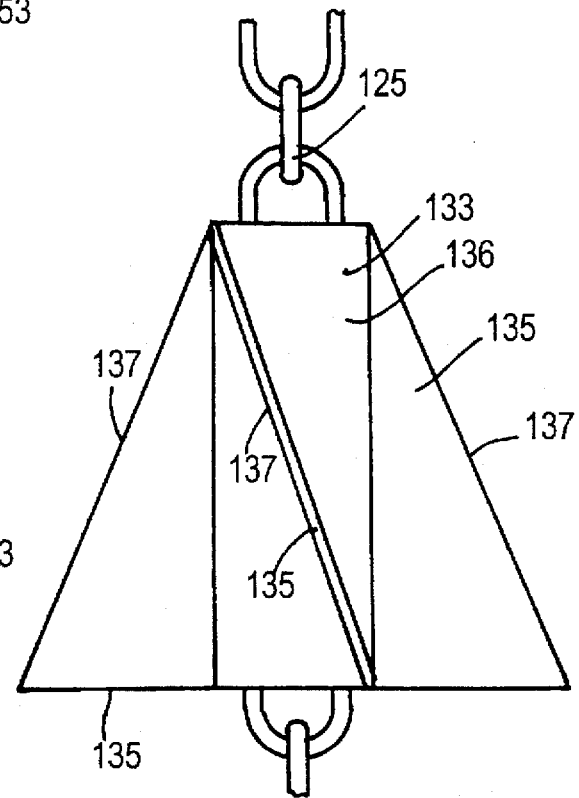
FIG. 16 is an end elevational view of another detail of the wagon of FIG. 1.

FIGS. 21 to 26 illustrate alternative types of cutting members 140, 150 and 160. FIG. 20 illustrates a dispensing rotor 30 with the cutting members 140 and 150 mounted thereon. Each cutting member 140, 150 and 160 comprises a mounting members 133 which is identical to the mounting member 133 of the cutting members 124. The cutting member 140 comprises a single cutting blade 141 which extends perpendicularly from the mounting member 133 and transversely thereof. The cutting blade 141 terminates at its free end in a cutting edge 142 which is slightly angled.

The cutting member 150 comprises a mounting member 133 identical to the mounting member 133 of the cutting members 124. A cutting blade 151 is formed by a square cutting disc 152 which is perpendicular to and extends completely around the mounting member 133 and terminates in a peripheral cutting edge 153, which extends around the cutting disc 152. As can be seen the mounting member 133 extends through the disc 152 and the sides 136 of the mounting member 133 are disposed at an angle of approximately 45° to the cutting edges 153.

The cutting member 160 is substantially similar to the cutting member 140 with the exception that a cutting blade 161 which extends perpendicularly from the mounting member 133 and transversely thereof extends at 162 and 163 at opposite sides of the mounting member 133. The blade 161 terminates in an elongated cutting edge 164 which is inclined relative to the mounting member 133.

Returning now to FIGS. 1 to 19, and referring in particular to FIGS. 1, 14 and 15, a rupturing means for rupturing and dislodging compacted fibrous material which it has been found builds up and adheres to the rotor disc 31 adjacent the rotational axis thereof is illustrated. The rupturing means comprises a rupturing member 170 which is mounted on the piston member 45 and extends in a generally downstream direction for cooperating with but not engaging the dispensing rotor 30. It has been found that where the fiber content of the material being dispensed from the spreader wagon 1, for example, where the material has a high straw or hay content, a central cone of compacted fibrous material builds up on the rotor disc 31, and the cone of fibrous material, in general, is substantially coaxial with the rotational axis of the dispensing rotor 30. The rupturing member 170 is of square shape transverse cross-section and is formed by four side plates 172 of steel which are seam welded together along seams 173. The side plates 172 are welded to the piston member 45 along seam 174. The side plates 172 define outer side faces 175 which converge in a downstream direction to an end face 176 which is open. The end face 176 is square. The rupturing member 170 is located on the piston member 45 so that a central axis 178 of the rupturing member 170 lies in a horizontal plane which contains the central axis 18 of the container 10. Further, the central axis 178 of the rupturing member 170 is offset from the central axis 18 to one side thereof. However, the distance between the axes 178 and 18 is such that a portion of one of the side faces 175, namely, the side face 175a where it extends from the piston member 45 substantially coincides with the central axis 18. This ensures that as the piston member 45 approaches the dispensing rotor 30 the rupturing member 170 is brought into engagement with the cone of the compacted fibrous material on the dispensing rotor 30 for rupturing and dislodging the cone from the dispensing rotor 30.

The rupturing member 170 is located on the piston member 45 on the side of the central axis 18 towards the side wall 15 so that the rupturing member 170 engages the cone of compacted fibrous material as the compacted fibrous material is moving in a general direction downwardly relative to the rupturing member 170. The length of the rupturing member 170 in an upstream/downstream direction is such that when the piston member 45 is at the end of its travel in the downstream direction, in other words, is at its closest position to the dispensing rotor 30, the end face 176 of the rupturing member 170 is spaced apart from the dispensing rotor, and is also sufficiently spaced apart from the dispensing rotor 30 that the rupturing member 170 avoids the ribs 120, chains 125 and 126 and cutting members 124. However, the rupturing member 170 in this position of the piston member 45 is sufficiently close to the dispensing rotor 30 to engage the cone of compressed fibrous material. Typically, the preferred distance between the free end 176 of the rupturing member 170 and the rotor disc 131 is in the order of 50 mm.

Referring to FIGS. 1, 7 and 8 a dispersing means comprising a dispersing member 180 is pivotally mounted on the container 10 and extends substantially across the dispensing outlet 19 for dispersing material being discharged through the dispensing outlet 19. The dispersing member 180 comprises a mounting bar 181 of steel which is pivotally carried in pivot mounting brackets 183 which extend sidewardly from the downstream end wall 17. A plurality of spaced apart parallel dispersing bars 184 of steel extend from the mounting bar 181 across the dispensing outlet 19. The dispersing bars 184 lie in a common plane which extends in a generally upward/downward direction, and also extends in a generally rearward direction relative to the container 10. The angle at which the common plane of the dispersing bars 184 makes with the side wall 16 of the container may be varied by pivoting the dispensing member 180 in the mounting brackets 183 for varying the amount of dispersion achieved by the dispersing member 180. The dispersing bars 184 as can be seen are inclined upwardly rearwardly relative to the horizontal. The mounting bar 181 when viewed from the side of the container, in other words, transversely relative to the central axis 18 is substantially vertical, however, when viewed from the upstream end of the container 11, in other words, in a direction parallel to the central axis 18 the mounting bar 18 is inclined to the vertical in a direction upwardly outwardly of the side wall 16 of the container 10. This it has been found further facilitates in dispersing material being dispensed through the dispensing outlet 19.

To vary the dispersing effect the dispersing member 180 has on the material being dispensed through the dispensing outlet 19, the angle of the dispersing member 180 relative to the side wall 16 of the container 10 is varied by pivoting the mounting bar 181 in the mounting brackets 183. A lug 185 extending from the mounting bar 181 abuts an adjustable locating member 186 for locating the dispersing member 180 at a desired dispersing angle. The locating member 186 is slidable in a tubular bracket 187 and a pin 188 through the bracket 187 engages one of a plurality of holes 189 in the locating member 186 for positioning the locating member 186 at the desired dispersing angle.

An hydraulic control circuit (not shown) which comprises control valves (also not shown) is provided for controlling the operation of the rams 25, 48 and 65.

In use, the spreader wagon i is coupled to a tractor or other suitable towing vehicle. The power take-off shaft of the tractor is connected to the splined end 44 of the shaft 41 for rotating the dispensing rotor 30 in the direction of the arrow A. An hydraulic supply is coupled to the hydraulic control circuit (not shown) for powering the rams 25, 48 and 65. The piston member 45 is withdrawn to the upstream end 12 of the container 10, and the isolating plate 55 is lowered into the closed position. The container 10 is loaded with the material to be dispensed. When it is desired to dispense material from the container 10 the closure plate 20 is moved into the open position and the dispersing member 180 is set at the desired dispersing angle. The dispensing rotor 30 is then rotated by the power take-off shaft of the tractor and is run up to its full normal operating speed. This is achieved without any danger of damage to the dispensing rotor 30 or shearing of the rotor shaft 32 due to the fact that the isolating plate 55 isolates the upstream portion 56 from the dispensing rotor 30, thereby maintaining the dispensing rotor 30 isolated from the material in the container 10. In this embodiment of the invention the dispensing rotor 30 is normally operated at 180 revs. per minute. On the dispensing rotor 30 having been run up to full speed, the isolating plate 55 is raised into the open position, and material to be dispensed on coming into engagement with the dispensing rotor 30 is dispensed by the rotor 30 through the dispensing outlet 19. To maintain the material in the container 10 in contact with the dispensing rotor 30, hydraulic fluid pressure is applied to the ram 48 for causing the piston member 45 to maintain a constant urging action on the material in a downstream direction, for in turn urging the material into engagement with the dispensing rotor 30. As the material is being dispensed by the dispensing rotor 30, the piston member 45 is continuously urged along the container 10 in a downstream direction towards the dispensing rotor 30 by the drive ram 48.

As discussed above, as the piston member 45 nears the end of its travel in the downstream direction, in other words, is relatively close to the dispensing rotor 30, the rupturing member 170 engages a cone of compacted fibrous material on the dispensing rotor 30 if such a cone has built up and has adhered to the rotor disc 31, and ruptures and dislodges the cone from the rotor disc 31.

On all the material having been dispensed from the container 10 the piston member 45 is urged in the upstream direction to the upstream end by the ram 48. The isolating plate 55 is lowered into the closed position and the container 10 is ready to receive the next load of material for spreading.

Prior to loading the material to be dispensed into the container the cutting members 124, 140, 150 and 160 most appropriate to the material being handled by the spreader wagon 1 are secured to the chains 125 and 126 and are located in the desired locations along the chains 125 and 126. In general, it is envisaged that a combination of cutting members will be required for dispensing animal fodder which includes fibrous material, such as straw, hay and the like. It has been found that the cutting members 124 are particularly suitable for use with animal fodder containing straw.

While the dispensing rotor 30 is rotating and is in engagement with the material in the container 10, the cutting blades 131, 141, 151 and 161 of the cutting members 124, 140, 150 and 160, as the case may be, act on the material and cut and rip lumps of the material from the mass of material in the container 10. The ribs 120 dispense the material through the dispensing outlet 19 with centrifugal action as the dispensing rotor 30 rotates in the direction of the arrow A.

The advantages of the spreader wagon 1 according to the invention are many. In particular, the spreader wagon is particularly suitable for dispensing and spreading slurry type material which includes fibrous material such as straw and the like, typically, animal fodder or manure. By virtue of the fact that the isolating plate 55 in the closed position isolates the dispensing rotor 30 from the rest of the container 10, the dispensing rotor 30 can be maintained out of contact with the material until the dispensing rotor 30 is run up to its full dispensing speed. Accordingly, the starting torque required to run the dispensing rotor 30 up to full speed is relatively low since the rotor is free to rotate in a chamber formed between the downstream end wall 17 and the isolating plate 55. By raising the isolating plate 55 into the open position, the material in the container 10 is gradually brought into engagement with the dispensing rotor 30. Needless to say, the material can be brought into engagement relatively gradually with the dispensing rotor 30 by slowly raising the isolating plate 55. Thus, there is relatively no danger of damage being caused to the dispensing rotor 30 or to the rotor shaft 32 resulting from sudden or high torque demands by the dispensing rotor 30. Accordingly, one of the major problems with spreader wagons known heretofore whereby damage to the dispensing rotor and shearing of the rotor shaft has been a problem due to the relatively high starting torque required to run the dispensing rotor 30 up to speed when the dispensing rotor 30 immersed in the material being dispensed has to be overcome.

Once the dispensing rotor 30 is running at full speed, the torque requirement when the dispensing rotor is in engagement material is considerably less than would have been required to run the dispensing rotor up to speed if the dispensing rotor when stationary had been immersed in the material to be dispensed. Thus, shearing of the rotor shaft and damage to the dispensing rotor 30 is avoided.

Another particularly important advantage of the invention is achieved by the provision of the cutting members being releasably engagable with the dispensing rotor, and furthermore, by virtue of the fact that the cutting members are slidable on the chains. By virtue of this the cutting members and their relative positions on the chains can readily easily be changed and/or altered.

A further very important advantage of the invention is achieved by the provision of the rupturing member 170 on the piston member 45 for dislodging any build up of compacted fibrous material which may adhere to the dispensing rotor. This has been a problem in spreader wagons known heretofore, and in many cases, if the cone of compacted material is not dislodged, the cone can build to a relatively large size after the container has been filled and emptied a number of times, this cone, thus inhibits efficient dispensing of material by the dispensing rotor.

A further advantage of the invention is achieved by virtue of the fact that the transmission linkage 50 is pivotally connected to the container 10 below the level of the base 14. This minimizes the overall height of the wagon 1 when the piston member 45 is in the extreme upstream end position. In this position, the first and second linkage arms 87 and 88 extend substantially upwardly, and achieve their maximum height above the wagon. Cranking of the first link arm 87 at 90 enables the first and second link arms 87 and 88 to pivot to lie substantially parallel to the base 14 when the piston member 45 is at the extreme downstream end of its movement.

Referring now to FIGS. 27 and 28, there is illustrated a cutting member 190 which may also be used with the dispensing rotor 30. The cutting member 190 is substantially similar to the cutting members 124 with the exception that the cutting member 190 is made from heavier material. Four cutting blades 191 and a mounting member 192 are formed by bending a pair of plate members 193 at 194, and joining the plate members by side plate members 195 so that portions 196 of the plate members 193 form the cutting blades 191, while portions 197 of the plate members 193 and the side plate members 195 form the mounting member 192. The plate members 193 and side plate members 195 are seam welded at 198. The cutting blades 191 terminate in cutting edges 199 which diverge outwardly of the mounting member 192. A bore 200 extending through the mounting member 192 is sized to be slidable on the first and/or second chains 125 and 126, and the cutting members 190 may be mounted on the chains 125 and 126 with the cutting edges 199 diverging radially outwardly of the center of the rotor disc 31, as is the case with the cutting members 124. The cutting edges 199 of the cutting blades 191 are relatively blunt, but if desired could be angled to provide a relatively sharp cutting edge.

Referring now to FIGS. 29 to 31, the dispensing rotor 30 is illustrated with cutting members 210 of a different construction to those already described. In this case, a single cutting member 210 is mounted on the chains 125 and 126 between the central point of the chains 125 and 126 where they are connected to each other and their anchor members 127 to 129. The cutting member in this embodiment of the invention comprises a mounting member 212 of square box section steel having a square bore 213 extending therethrough for slidably engaging the chains 125 and 126. A plurality of spaced apart cutting blades 214 are mounted at spaced apart intervals along the mounting member 212 and extend outwardly therefrom. Each cutting blade 214 extends transversely of the mounting member 212 and terminates in a free cutting edge 215 which is angled as can be seen in FIG. 31. The cutting edge 215 is relatively blunt, but if desired may be angled to form a relatively sharp cutting edge. The cutting members 210 are mounted on the chains 125 and 126 with the cutting blades 214 extending from the dispensing rotor 30 in a generally downstream direction for engaging the material in the container 10 and for ripping lumps of the material therefrom. The cutting members 210 may be arranged on the chains 125 and 126 so that either the ends 216 or 217 of the cutting edge 215 act as leading edges. In general, it is envisaged that it is preferable that the end 216 should form the leading edge as the dispensing rotor 30 rotates. It is envisaged that the spacing of the blades 214 may be different on each cutting member 210 so that the blades 214 of the respective cutting members 210 engage the material in the container 10 at different radial locations from the central axis 18 of the container 10.

While a particular construction of isolating means has been described, any other suitable isolating means may be provided. Needless to say other suitable dispensing rotors may be provided, and it is also envisaged that in certain cases, where the dispensing rotor is provided by a circular disc, the diameter of the disc may be less than the diameter of the base of the container. Indeed, it is envisaged in certain cases, that it is not essential that the base of the container be of circular cross-section. Any other suitable means for urging the material in the container towards the dispensing rotor besides a piston member may be provided.

While the dispensing rotor has been described as comprising a dispensing disc, the dispensing rotor may be of any other shape and construction, and may be of diameter considerably less than the cross-section of the container. Indeed, in such cases, it is envisaged that dispensing chains may extend radially outwardly from the dispensing rotor for dispensing material from the container through the dispensing outlet. It is also envisaged that other construction and/or arrangement of chains may be provided. For example, it is envisaged in certain cases that additional chains may extend between the first and second chains and between the legs of the chain as radians. While it is preferable, that the chains be releasably connected to the dispensing rotor, this is not essential. Furthermore, it will be appreciated that other cutting means besides those described may be used.

It will of course be appreciated that other means for moving the isolating plate and for driving the piston member besides hydraulic rams may be used.

We claim:

1. Apparatus for spreading material, the apparatus (1) comprising an elongated container (10) for the material extending from an upstream end (11) to a downstream end (12) and defining a longitudinally extending central axis (18), the container (10) being of substantially constant inner transverse cross-section, and comprising a base (14) of semi-circular transverse cross-section, the axis of generation of which co-incides with the central axis (18), a pair of spaced apart side walls (15,16) extending generally upwardly from the base (14) on opposite sides thereof and between the upstream and downstream ends (11,12), and a downstream end wall (17) extending upwardly from the base (14) between the side walls (15,16), a dispensing outlet (19) from one side of the container (10) being located adjacent the downstream end (12) thereof through which material from the container (10) is dispersed, a dispensing rotor (30) located in the container (10) at the downstream end (12) adjacent the downstream end wall (17), and being rotatable about a rotational axis (18) which extends parallel to and co-incides with the central axis (18) of the container (10) for dispensing material from the container (10) through the dispensing outlet (19), an urging means (45) located in the container (10) for urging material in the container (10) in a downstream direction towards the dispensing rotor (30), and an isolating means (55) comprising an isolating plate (55), extending transversely of the central axis (18) and being slidably located in the container (10) adjacent the downstream end (12) thereof and upstream of the dispensing rotor (30), the isolating plate (55) having an outer periphery which substantially defines the periphery of the inner transverse cross-section of the container (10) for sealably engaging the base (14) and the side walls (15,16) for selectively isolating the dispensing rotor (30) from a portion (56) of the container (10) which is upstream of the isolating plate (55), the isolating plate (55) being slidable upwardly transversely of the central axis (18) from a closed position with the outer periphery of the isolating plate (55) sealably engaging the base (14) and side walls (15,16) for sealably isolating the dispensing rotor (30) from the upstream portion (56) of the container (10) to an open position with the dispensing rotor (30) communicating with the upstream portion (56) of the container (10) across substantially the entire inner transverse cross-section of the container (10) for receiving material from the upstream portion.

2. Apparatus as claimed in claim 1 wherein the isolating means (55) is slidable in a pair of spaced apart tracks (57) extending generally upwardly relative to the side walls (15,16).

3. Apparatus as claimed in claim 1 wherein an operating means (65) comprising a ram (65) is provided for moving the isolating means (55) between the closed position and the opened position.

4. Apparatus as claimed in claim 3 wherein the operating ram (65) is operably connected to the isolating means (55) by an operating linkage (66), which comprises a first link member (70) and a second link member (71) pivotally connected together, a free end of one of the first link members (70) being pivotally connected to the container (10), and a free end of the second link member (71) being pivotally connected to the isolating means (55), the operating ram (65) being pivotally connected to the container (10) and to the first link member (70), the operating ram (65) being connected to the first link member (70) at a location intermediate and spaced apart from the pivotal connection connecting the link members (70,71) together and the pivotal connection of the first link member (70) to the container (10).

5. Apparatus as claimed in claim 1 wherein the dispensing outlet (19) is located in one of the side walls (16) adjacent the downstream end wall (17), and the dispensing outlet (19) extends downwardly into portion of the base (14) adjacent the side wall (16), the dispensing outlet (19) being formed by an elongated slot (19) extending in a generally upwardly/downwardly direction, and a closure means (20) is provided for selectively closing the dispensing outlet (19).

6. Apparatus as claimed in claim 1 wherein the dispensing rotor (30) comprises a rotor disc (31) rotatable about its geometrical central axis, at least two anchor means (127, 128,129) being provided on the rotor disc (31) at spaced apart locations for anchoring an elongated first ligature (125) extending between the anchor means, and at least one cutting means (124,140,150,160) mounted on the first ligature (125) for engaging the material in the container (10) as the dispensing rotor (30) rotates.

7. Apparatus as claimed in claim 6 wherein a third anchor means (129) is provided on the rotor disc (31), and a connecting means (130) is provided on the first ligature (125) intermediate the ends thereof for connecting the first ligature to a second ligature (126) extending from the third anchor means (129), and at least one cutting means (124, 140,150,160) being mounted of the second ligature (126) for engaging the material in the container (10), as the dispensing rotor (30) rotates.

8. Apparatus as claimed in claim 7 wherein the connecting means (130) slidably engages the first ligature.

9. Apparatus as claimed in claim 6 wherein each cutting means (124,140,150,160) is slidably engagable with the corresponding ligature (125,126).

10. Apparatus as claimed in claim 6 wherein each cutting means (135,141,151,161) is mounted on a tubular mounting member (133) having a bore (134) extending therethrough for slidably engaging the corresponding ligature (125,126).

11. Apparatus as claimed in claim 1 wherein the urging means (45) comprises a piston plate member (45) located in the container (10) and extending transversely of the central axis (18) of the container (10), the periphery of the urging means (45) substantially defining the periphery of the inner transverse cross-section of the container (10), the piston member (45) being movable longitudinally along the container (10) from the upstream end (11) to the downstream end (12) thereof for urging the material towards the dispensing rotor (30), and the urging means (45) co-operates with the base (14) and side walls (15,16) of the container (10) for retaining material within the container (10).

12. Apparatus as claimed in claim 1 wherein a drive means (48) is provided for moving the urging means (45) along the container (10), the drive means (48) comprising a drive ram (48) and a transmission linkage (50) operably connecting the drive ram (48) to the urging means (45), the transmission linkage (50) comprising a first elongated link arm (87) and a second elongated link arm (88) pivotally connected together adjacent respective ends thereof, a free end of the first link arm (87) being pivotally connected to the container (10) adjacent the upstream end (11) thereof and adjacent the base (14), a free end of the second link arm (88) being pivotally connected to the urging means (45), the drive ram (48) being pivotally connected to the first and second link arms (87,88) intermediate the respective ends thereof for urging the respective free ends of the first and second link arms (87,88) away from and towards each other for moving the urging means (45) towards and away from the dispensing rotor (30), respectively, the second link arm (88) forming with a third link arm (101) a parallel linkage for moving the urging means (45) along the container (10) with rectilinear movement.

13. Apparatus as claimed in claim 12 wherein first link arm (87) is pivotally connected to the container at a level lower than the base (14), and is cranked intermediate its ends for accommodating pivotal action of the first link arm (87) relative to the base (14).

14. Apparatus as claimed in claim 12 wherein the third link arm (101) is pivotally connected to the urging means (45) and to the first link arm (87), the third link arm (101) being pivotally connected to the urging means (45) at a level above the pivotal connection of the second link arm (88) to the urging means (45), and the third link arm (101) is pivotally connected to the first link arm (87) to a portion (104) of the first link arm (87) extending from the first link arm (87) beyond the pivotal connection of the first and second link arms (87,88).

15. Apparatus as claimed in claim 1 wherein a rupturing means (170) is provided for rupturing and dislodging compacted fibrous material from the dispensing rotor (30).

16. Apparatus as claimed in claim 15 wherein the rupturing means (170) comprises a rupturing member (170) tapering from the urging means (45).

17. Apparatus for spreading material, the apparatus (1) comprising:

an elongated container (10) for the material extending from an upstream end (15) to a downstream end (12) and defining a longitudinally extending central axis (18), the container (10) being of substantially constant inner transverse cross-section, and comprising a base (14) of semi-circular transverse cross-section, the axis of generation of which co-incides with the central axis (18), a pair of spaced apart side walls (15,16) extending generally upwardly from the base (14) on opposite sides thereof and between the upstream and downstream ends (11,17), and a downstream end wall (17) extending upwardly from the base (14) between the side walls (15,16), a dispensing outlet (19) from one side of the container (10) being located adjacent the downstream end (12) thereof through which material from the container (10) is dispersed, a dispensing rotor (30) located in the container (10) at the downstream end (12) adjacent the downstream end wall (17), and being rotatable about a rotational axis (18) which extends parallel to and co-incides with the central axis (18) of the container (10) for dispensing material from the container (10) through the dispensing outlet (19), an urging means (45) located in the container (10) for urging material in the container (10) in a downstream direction towards the dispensing rotor (30), an isolating means (55) extending transversely of the central axis (18) and located in the container (10) adjacent the downstream end (12) and upstream of the dispensing rotor (30) for selectively isolating the dispensing rotor (30) from a portion (56) of the container which is upstream of the isolating means (55), the isolating means (55) being movable between a closed position for isolating the dispensing rotor (30) from the upstream portion (56) of the container (10) and an open position whereby the dispensing rotor (30) communicates with the upstream portion (56) of the container (10) for receiving material therefrom, and a rupturing means (170) mounted on the urging means for dislodging compacted fibrous material from the dispensing rotor (30).

18. Apparatus for spreading material, the apparatus (1) comprising an elongated container (10) for the material extending from an upstream end (11) to a downstream end (12) and defining a longitudinally extending central axis (18), the container (10) being of substantially constant inner transverse cross-section, and comprising a base (14) of semi-circular transverse cross-section, the axis of generation of which co-incides with the central axis (18), a pair of spaced apart side walls (15,16) extending generally upwardly from the base (14) on opposite sides thereof and between the upstream and downstream ends (11,12), and a downstream end wall (17) extending upwardly from the base (14) between the side walls (15,16), a dispensing outlet (19) from one side of the container (10) being located adjacent the downstream end (12) thereof through which material from the container (10) is dispersed, a dispensing rotor (30) located in the container (10) at the downstream end (12) adjacent the downstream end wall (17), and being rotatable about a rotational axis (18) which extends parallel to and co-incides with the central axis (18) of the container (10) for dispensing material from the container (10) through the dispensing outlet (19), an isolating means (55) extending transversely of the central axis (18) and located in the container (10) adjacent the downstream end (12) and upstream of the dispensing rotor (30) for selectively isolating the dispensing rotor (30) from a portion (56) of the container which is upstream of the isolating means (55), the isolating means (55) being movable between a closed position for isolating the dispensing rotor (30) from the upstream portion (56) of the container (10) and an open position whereby the dispensing rotor (30) communicates with the upstream portion (56) of the container (10) for receiving material therefrom, an urging means (45) being located in the container (10) for urging material in the container (10) in a downstream direction towards the dispensing rotor (30), and extending transversely of the central axis (18), a drive means being provided for moving the urging means (45) in a longitudinal direction along the container (10), and a transmission linkage (50) being operably connected to the drive means (48) and the urging means (45), the transmission linkage (50) comprising a first elongated link arm (87) and a second elongated link arm (88) pivotally connected together adjacent respective ends thereof, a free end (91) of the first link arm (87) being pivotally connected to the container (10) adjacent the upstream end (11) thereof and adjacent the base (14), and a free end of the second link arm (88) being pivotally connected to the urging means (45).

\* \* \* \* \*